US010222951B2

(12) United States Patent
Gilboa

(10) Patent No.: US 10,222,951 B2
(45) Date of Patent: *Mar. 5, 2019

(54) MODELING SYSTEM FOR GRAPHIC USER INTERFACE

(71) Applicant: SAP SE, Walldorf (DE)

(72) Inventor: Yuval Gilboa, Pardesiya (IL)

(73) Assignee: SAP SE, Walldorf (DE)

(*) Notice: Subject to any disclaimer, the term of this patent is extended or adjusted under 35 U.S.C. 154(b) by 356 days.

This patent is subject to a terminal disclaimer.

(21) Appl. No.: 15/135,907

(22) Filed: Apr. 22, 2016

(65) Prior Publication Data

US 2016/0239170 A1 Aug. 18, 2016

Related U.S. Application Data

(63) Continuation of application No. 14/025,282, filed on Sep. 12, 2013, now Pat. No. 9,348,483, which is a
(Continued)

(51) Int. Cl.
*G06F 17/21* (2006.01)
*G06F 3/0484* (2013.01)
(Continued)

(52) U.S. Cl.
CPC ............ *G06F 3/0484* (2013.01); *G06F 3/048* (2013.01); *G06F 3/0482* (2013.01); *G06F 8/38* (2013.01);
(Continued)

(58) Field of Classification Search
CPC .................................................. G06F 17/211
(Continued)

(56) References Cited

U.S. PATENT DOCUMENTS 5,446,846 A 8/1995 Lennartsson
5,802,514 A 9/1998 Huber
(Continued)

FOREIGN PATENT DOCUMENTS

JP 2001-331591 A 11/2001
JP 2002-196926 A2 7/2002
(Continued)

OTHER PUBLICATIONS

Homrighausen, Andreas, Hans-Werner Six, and Mario Winter. "Round-trip prototyping based on integrated functional and user interface requirements specifications." Requirements Engineering 7, No. 1 (2002): 34-45. (Year: 2002).*
(Continued)

*Primary Examiner* — Frank D Mills
(74) *Attorney, Agent, or Firm* — Fountainhead Law Group P.C.

(57) ABSTRACT

A modeling system for universal specification of user interfaces. The system provides a means for defining user interfaces, including highly complex and dynamic user interfaces, in a manner that is independent of any implementation context. The modeling system leads from a user-friendly visual representation of the user interface, through progressively detailed specifications of structural and behavioral aspects of the user interface parts, until a rigorous definition of the user interface in all its contexts of use is achieved. Using the information captured in the model, tools that automatically generate the fully working user interface code can be built.

18 Claims, 23 Drawing Sheets

Related U.S. Application Data continuation of application No. 13/953,623, filed on Jul. 29, 2013, now Pat. No. 9,348,482, which is a continuation of application No. 12/613,250, filed on Nov. 5, 2009, now Pat. No. 8,522,139, which is a continuation of application No. 12/163,897, filed on Jun. 27, 2008, now Pat. No. 7,636,895, which is a continuation of application No. 10/712,771, filed on Nov. 12, 2003, now Pat. No. 7,412,658.

(60) Provisional application No. 60/479,017, filed on Jun. 16, 2003, provisional application No. 60/426,097, filed on Nov. 14, 2002.

(51) Int. Cl.
| | | |
|---|---|---|
| G06F 8/38 | (2018.01) | |
| G06Q 10/06 | (2012.01) | |
| G06F 3/048 | (2013.01) | |
| G06F 17/22 | (2006.01) | |
| G06F 17/24 | (2006.01) | |
| G06F 3/0482 | (2013.01) | |
| G06F 9/451 | (2018.01) | |

(52) U.S. Cl.
CPC ............ *G06F 9/451* (2018.02); *G06F 17/211* (2013.01); *G06F 17/2247* (2013.01); *G06F 17/2252* (2013.01); *G06F 17/2288* (2013.01); *G06F 17/24* (2013.01); *G06Q 10/067* (2013.01); *G06F 2203/04803* (2013.01)

(58) Field of Classification Search
USPC ........................................................ 715/763
See application file for complete search history.

(56) References Cited

U.S. PATENT DOCUMENTS

| | | | |
|---|---|---|---|
| 6,049,822 | A | 4/2000 | Mittal |
| 6,097,382 | A | 8/2000 | Rosen et al. |
| 6,222,537 | B1 | 4/2001 | Smith et al. |
| 6,230,309 | B1 | 5/2001 | Turner et al. |
| 6,247,174 | B1 | 6/2001 | Santhanam et al. |
| 6,331,864 | B1 | 12/2001 | Coco et al. |
| 6,407,761 | B1 | 6/2002 | Ching et al. |
| 6,429,880 | B2 | 8/2002 | Marcos et al. |
| 6,476,828 | B1 | 11/2002 | Burkett et al. |
| 6,553,563 | B2 | 4/2003 | Ambrose et al. |
| 6,590,589 | B1 | 7/2003 | Sluiman et al. |
| 6,604,110 | B1 | 8/2003 | Savage et al. |
| 6,898,794 | B2 | 5/2005 | Babutzka et al. |
| 6,973,638 | B1 | 12/2005 | Gangopadhyay et al. |
| 7,043,693 | B2 | 5/2006 | Wenzel et al. |
| 7,069,538 | B1 | 6/2006 | Renshaw |
| 7,127,328 | B2 | 10/2006 | Ransom |
| 7,246,344 | B1 | 7/2007 | Christensen et al. |
| 7,412,658 | B2 | 8/2008 | Gilboa |
| 7,463,263 | B2 | 12/2008 | Gilboa |
| 7,636,895 | B2 | 12/2009 | Gilboa |
| 8,015,541 | B1 | 9/2011 | Srinivasan et al. |
| 2001/0045963 | A1 | 11/2001 | Marcos et al. |
| 2001/0052113 | A1 | 12/2001 | Hearne et al. |
| 2002/0049789 | A1 | 4/2002 | Frolich et al. |
| 2002/0062475 | A1* | 5/2002 | Iborra ..................... G06F 8/30 717/108 |
| 2002/0066074 | A1 | 5/2002 | Jabri |
| 2002/0085020 | A1 | 7/2002 | Carroll, Jr. |
| 2002/0091990 | A1 | 7/2002 | Little et al. |
| 2002/0095653 | A1 | 7/2002 | Parr et al. |
| 2002/0099530 | A1 | 7/2002 | Foltinek |
| 2002/0104068 | A1 | 8/2002 | Barrett et al. |
| 2002/0105548 | A1 | 8/2002 | Hayton et al. |
| 2002/0120917 | A1 | 8/2002 | Abrari et al. |
| 2002/0149619 | A1 | 10/2002 | Sauer |
| 2002/0186248 | A1* | 12/2002 | Ramanathan ............ G06F 8/38 715/780 |
| 2003/0033437 | A1 | 2/2003 | Fischer et al. |
| 2003/0055837 | A1 | 3/2003 | Brobst et al. |
| 2003/0066028 | A1 | 4/2003 | Payne |
| 2003/0098880 | A1 | 5/2003 | Reddy et al. |
| 2003/0110192 | A1 | 6/2003 | Valente |
| 2003/0122867 | A1 | 7/2003 | Choi et al. |
| 2003/0145305 | A1 | 7/2003 | Ruggier |
| 2003/0167278 | A1 | 9/2003 | Baudel |
| 2003/0169293 | A1 | 9/2003 | Savage |
| 2003/0202014 | A1 | 10/2003 | Wood |
| 2003/0204564 | A1 | 10/2003 | Keene |
| 2003/0220707 | A1 | 11/2003 | Budinger et al. |
| 2003/0236690 | A1 | 12/2003 | Johnston-Watt et al. |
| 2004/0006550 | A1 | 1/2004 | Upton |
| 2004/0021679 | A1 | 2/2004 | Chapman et al. |
| 2004/0044985 | A1 | 3/2004 | Kompalli et al. |
| 2004/0049481 | A1 | 3/2004 | Blevins |
| 2004/0083463 | A1 | 4/2004 | Hawley |
| 2004/0109024 | A1 | 6/2004 | Hori et al. |
| 2004/0113930 | A1 | 6/2004 | Hawley et al. |
| 2004/0148586 | A1 | 7/2004 | Gilboa |
| 2004/0153992 | A1 | 8/2004 | Molina-Moreno et al. |
| 2004/0181500 | A1 | 9/2004 | Huelsman et al. |
| 2004/0201600 | A1 | 10/2004 | Kakivaya et al. |
| 2004/0205669 | A1 | 10/2004 | Hoidahl |
| 2005/0010893 | A1 | 1/2005 | Schmidt et al. |
| 2005/0203951 | A1 | 9/2005 | Schroeder et al. |
| 2005/0257157 | A1 | 11/2005 | Gilboa et al. |
| 2005/0261884 | A1 | 11/2005 | Sakamoto et al. |
| 2006/0004845 | A1 | 1/2006 | Kristiansen et al. |
| 2006/0004887 | A1 | 1/2006 | Schenk |
| 2006/0036479 | A1 | 2/2006 | Whitmore |
| 2006/0047789 | A1 | 3/2006 | Kumar et al. |
| 2006/0064667 | A1 | 3/2006 | Freitas |
| 2006/0161888 | A1 | 7/2006 | Lovisa et al. |
| 2006/0168278 | A1 | 7/2006 | Lazen et al. |
| 2006/0206864 | A1 | 9/2006 | Shenfield et al. |
| 2006/0206890 | A1 | 9/2006 | Shenfield et al. |
| 2007/0022394 | A1 | 1/2007 | Ghosh et al. |
| 2007/0038609 | A1 | 2/2007 | Wu |
| 2007/0094609 | A1 | 4/2007 | Gilboa et al. |
| 2007/0157159 | A1 | 7/2007 | Fidebrandt et al. |
| 2007/0168383 | A1 | 7/2007 | Fidebrandt et al. |
| 2007/0168384 | A1 | 7/2007 | Fidebrandt et al. |
| 2007/0213972 | A1 | 9/2007 | Schejter et al. |
| 2007/0239717 | A1 | 10/2007 | Thrash et al. |
| 2009/0006992 | A1 | 1/2009 | Gilboa |
| 2009/0007062 | A1 | 1/2009 | Gilboa |
| 2009/0172695 | A1 | 7/2009 | Lazaroff et al. |
| 2010/0050152 | A1 | 2/2010 | Gilboa |

FOREIGN PATENT DOCUMENTS

| | | |
|---|---|---|
| JP | 2002-229788 A | 8/2002 |
| WO | 0068785 A1 | 11/2000 |
| WO | 200177822 A2 | 10/2001 |
| WO | 2002086705 A1 | 10/2002 |
| WO | 2004036340 A2 | 4/2004 |

OTHER PUBLICATIONS

Elkoutbi, Mohammed, Ismail Khriss, and Rudolf K. Keller. "Generating user interface prototypes from scenarios." In Requirements Engineering, 1999. Proceedings. IEEE International Symposium on, pp. 150-158. IEEE, 1999. (Year: 1999).*

Callahan, Evan, "Microsoft Access 2000: Visual Basic Applications Fundamentals," Published by Microsoft Press, Ed. Eric Stroo and Wendy Zucker, Carl Siechert, and Blake Wesley Whittington, Chris Wood. 1999.

Microsoft Computer Dictionary, 5th Ed., Microsoft Press, word: "distributed systems", Published on May 1, 2002.

Ayers, Larry, "A Beginner's Guide to Compiling Source Code,", Internet article retrieved from: http://www.inuxjournal.com/article/0216. Dec. 1, 1996.

(56) References Cited

OTHER PUBLICATIONS

Verio—"Logging into your Server from FrontPage," Internet article retrieved from: http://www.verio.com/support/documents/view_article.cfm?doc id=3703. 2006.
Fitzloff, Emily, Gardner, Dana, "Web Open Enterprise Portals," Internet article retrieved from: http://www.infoworld.com/cgi-bin/displayStory.pl?/features/990125eip.htm. 1999.
ABAP, Internet article, retrieved from: http://www.wikipedia.org/wiki/ABAP. Apr. 2007.
Canonical, Internet article, retrieved from: http:/dictionary.reference.com/browse/canonical 2000.
"RFC, Internet article, retireved from: http://en.wikipedia.org/wiki/Remote_function_call Mar. 2007".
XML, Internet article, retrieved from: http://en.wikipedia.org/wiki/Xml Mar. 2007.
Nora Koch and Andreas Kraus, "The Expressive Power of UML-based Web Engineering," Ludwig-Maximilians-University Munchen. In Proceedings of the 2nd International Workshop on Web-Oriented Software Technologies, IWWOST. May 2002.
Abrams et al., "UIML: An Appliance-Independent XML User Interface Language". Computer Networks (1999). vol. 31, No. 11-16, pp. 1695-1708.
Ceri, Stefano et al., "Web Modeling Language (WebML): A Modeling Language for Designing Web Sites," Computer Networks (2000). vol. 33, pp. 137-157.
Hideki Yamamoto, Development of Servlet by Using VisualAge for Java, TRY! PC, CQ Publishing co., Ltd., Mar. 1, 2000, vol. 12, No. 3, pp. 37-41.
Manabu Miyashiro, easily creating a web application/service—Let's use Kylix 2, Nikkei Linux, Nikkei Business Publications, Inc., Mar. 8, 2002, vol. 4, No. 3, pp. 68-107.
Japanese Office Action dated Oct. 27, 2009 for JP Application No. 2005-506655 (English Translation); 13 pages.

\* cited by examiner

MODELING SYSTEM FOR GRAPHIC USER INTERFACE

CROSS-REFERENCES TO RELATED APPLICATIONS

The present application claims priority from U.S. patent application Ser. No. 14/025,282, filed on Sep. 12, 2013, which claims priority from U.S. patent application Ser. No. 13/953,623, filed on Jul. 29, 2013, which claims priority from U.S. patent application Ser. No. 12/613,250, filed on Nov. 5, 2009, which claims priority from U.S. patent application Ser. No. 12/163,897, filed on Jun. 27, 2008, which claims priority from U.S. patent application Ser. No. 10/712,771, filed on Nov. 12, 2003, which claims priority from U.S. Provisional Application No. 60/426,097, filed on Nov. 14, 2002, and U.S. Provisional Application No. 60/479,017, filed on Jun. 16, 2003, all of which are incorporated herein by reference for all purposes.

BACKGROUND OF THE INVENTION

The present invention relates to the field of human-computer interaction, and in particular to user interface modeling.

The construction and maintenance of user interfaces is becoming a central problem for large, complex systems. User interfaces are the bridge between applications and users, and, as a result, have to cope with the complexities of both. With the advent of new technologies and user-centered concerns, the user interface portion of interactive systems is becoming increasingly large and costly.

Faster and more capable machines and networks are providing users with more functionalities and more information, but at the same time are overwhelming them with more commands and options. User interfaces need to become more intelligent to assist users in performing their tasks, to be easier and more intuitive to learn, and to allow user customization so they can be tailored to the specific user needs and preferences.

Applications that scale across a wide range of devices need to provide users with the same or a scaled down version of the workstation functionality. New modalities such as speech, natural language, and hand-writing recognition are maturing, and may need to be incorporated into the user interface. Modern interaction techniques, such as direct manipulation or dynamic queries, require a high degree of parallelism in the user interface.

All these factors, and more, make user interfaces hard to design and implement. Accordingly, many surveys show that the user interface portion of a software system accounts for a significant portion of the overall system development effort. For example, one survey conducted over a wide range of projects, platforms, and development tools reports that the percentage of code size and design, implementation, and maintenance times that are devoted to the user interface is about 30-50% in a typical software project.

Dealing with the ever-increasing difficulties of user interface development requires a new approach—one that is not based on programming. Different methods have been proposed in the past for specifying user interfaces without programming, including: algebraic specification, grammar-based languages, transition diagrams, rule-based systems, and specification by demonstration.

However, none of these methods has been widely adopted. Development organizations resist formal specifications because they are difficult to understand, are not expressive enough, are usually not executable, and therefore, are viewed as unnecessary additional work. As a result, the common practice for user interface development is still predominantly based on programming.

SUMMARY OF THE INVENTION

The present invention relates to a modeling system or visual tool for creating user (UI) interfaces without manual coding. The modeling system is for the universal and declarative specification of user interfaces. The system provides a means for defining user interfaces, including highly complex and dynamic user interfaces, in a manner that is independent of implementation context.

An embodiment of the present invention relates to a system for modeling user interfaces in understandable terms, so that user interface designs can be easily read and communicated. Such a system preferably should be expressive enough to enable the modeling of arbitrarily complex and dynamic user interfaces. More preferably, the system should enable the automatic translation of user interface models to executable code, so that the laborious and error prone programming processes can be skipped.

In one embodiment, the modeling system fulfills the following three principles: (i) it is simple enough to be understood and designed by humans, (ii) it is expressive enough to describe widely divergent user interfaces of an information-processing application, and (iii) it is computationally-tractable, i.e., executable user interface code can be generated from it either through interpretation, compilation, or translation.

The system or visual tool is a computer program that enables the designer to create UI models visually and then generate the running user interface, i.e., convert the visual representation to executable code. The system has at its core a dynamic collection of object-oriented classes that represent and implement the various facets of the modeling elements (for both design-time and runtime). These classes are extensible, enabling the system to be extended and adapted to widely divergent modeling methods—even, non-UI modeling applications such as Business Workflow, database schemas, etc.

One embodiment of the present modeling system is a GUIMachine modeling system (also referred to as, "the GUIMachine Storyboard," or "GM Storyboard," "GM modeling system," or "Storyboard"), which is a framework for the creation user interfaces.

The GM modeling system accommodates different user interface (UI) types through the use of kits, connectors, or libraries of model elements and associated rules that factor the differences in the characteristics of different UI devices and rendering technologies. A single generic kit that accommodates a plurality of UI technologies (SAP EPS and SAP EP6, HTMLB, WebDynPro, Net, etc) is used in the present embodiment. This enables using one model for all of these UI technologies, so that a designer needs to only build a single model that translates to these various technologies without making adjustments to the model itself.

In GM modeling system, a user interface model or GM model is derived from the user and application requirements through a design elaboration process. The user interface model, which is a visual representation of the UI, is translated to user interface code, for each of the user interface contexts, through a code generation process.

In the present embodiment, a method for generating a business solution program or iView includes selecting a package and selecting a page associated with the selected package. The selected page has a plurality of iViews associated thereto. A first business function component is selected. A first operator is selected. To create another iView, an output port of the first business function component is connected to an input port of the first operator. The first business function components provides data to the first operator to process or manipulate the data.

The method also includes connecting an output port of the first operator to an input port of a second business function component. An output port of the second business function component is connected to a third business function component. Alternatively, an output port of the first operator may be connected to an input port of a second operator.

Once desired business function components and operators have been selected and arranged in a given configuration, the visual tool generates code for the business solution program or an iView. Alternatively, a separate compiler may be used to generated the code. The generated code does not require verification. The generated code does not require a performance tuning.

In another embodiment, a method for generating a program using a visual tool includes selecting a reusable application component associated with a business layer. The business layer is associated with one or more databases. An operator configured to process data in a given way is selected. The reusable application component is linked with the operator. A portal content component is generated according to a relationship between the reusable application component and the operator. The reusable application component is a business application program interface (BAPI) or a remote function call (RFC). The portal content component is an iView.

In another embodiment, a method for generating a user interface is described. The user interface is configured for use in a client-server environment. The method includes providing an editor for designing a visual representation of a user interface, the editor providing a workspace and a task panel to be displayed on a display device on a frontend system, the workspace being provided to design the visual representation thereon, the task panel providing a plurality of elements for use in designing the visual representation, one or more of the elements being associated with a backend system remotely located from the frontend system. A first actor is selected from the task panel, the first actor being a data source object that is one of the elements and includes application logic needed to access application layer provided in the backend system. The first actor is inserted into the workspace. A second actor selected from the task panel is inserted into the workspace. A relationship between the first actor and the second actor is diagrammatically defined. Executable code is generated from the first and second actors and the relationship thereof.

In another embodiment, a method for generating a user interface using a modeling system, includes providing an editor for designing a visual representation of a user interface, the editor providing a workspace and a task panel to be displayed on a display device on a frontend system, the workspace being provided to design the visual representation thereon, the task panel providing a plurality of elements for use in designing the visual representation, one or more of the elements being associated with a backend system remotely located from the frontend system; displaying a scenario selected by a user on the workspace, the scenario being compatible with user requirements for the user interface, the scenario including a plurality of interleaved scenes; defining each of the plurality of scenes according to inputs received from the user, each scene including concurrently active and collaborating actors, the actors being specialized computational units that represents threads of activities, where each scene is defined by diagrammatically defining a relationship between the actors associated with that scene; generating a canonic representation of a model represented by the scenario and the scenes; and generating executable of from the canonic representation.

In another embodiment, a method for generating a user interface in a distributed computer system includes displaying a first business function component selected by a first user on a first display area of a frontend system, the first business function component being associated with first application logic to access a first business application provided in a backend system; displaying a second business function component selected by the first user on the first display area of the frontend system, the second business function component being associated with second application logic to access a second business application provided in the backend system; and forming a relationship between the first and second business function components, wherein a visual representation of the user interface is created based on the displaying steps and the forming step.

In another embodiment, a distributed computer system includes means for displaying a first business function component selected by a first user on a first display area of a frontend system, the first business function component being associated with first application logic to access a first business application provided in a backend system; means for displaying a second business function component selected by the first user on the first display area of the frontend system, the second business function component being associated with second application logic to access a second business application provided in the backend system; and means for forming a relationship between the first and second business function components, wherein a visual representation of the user interface is created based on the displaying steps and the forming step.

In yet another embodiment, a computer readable medium includes a computer program. The computer program includes code for displaying a first business function component selected by a first user on a first display area of a frontend system, the first business function component being associated with first application logic to access a first business application provided in a backend system; code for displaying a second business function component selected by the first user on the first display area of the frontend system, the second business function component being associated with second application logic to access a second business application provided in the backend system; and code for forming a relationship between the first and second business function components, wherein a visual representation of the user interface is created based on the displaying steps and the forming step.

In yet another embodiment, a computer system comprises applications provided on a backend system coupled to a frontend system; and a computer readable medium. The computer readable medium includes code for displaying a first business function component selected by a first user on a first display area of the frontend system, the first business function component being associated with first application logic to access one or more business applications provided in a backend system; code for displaying a second business function component selected by the first user on the first display area of the frontend system, the second business function component being associated with second application logic to access one or more business applications provided in the backend system; and code for forming a relationship between the first and second business function components, wherein a visual representation of the user interface is created based on the displaying steps and the forming step.

The user interface modeling system described herein provides numerous benefits. The system is declaratively closed so that all the different aspects of a user interface can be expressed purely in declarative terms of the modeling language. The system provides a representation simple enough to be read and communicated by humans. The system is computationally tractable, thus enabling automated validation, simulation, and generation of working user interfaces from valid models. The system has the capacity for declaring elastic user interface models that withstand variations in the context of use while preserving usability. The system encourages modifiability and not enforce any particular development strategy. The system enables a strong parallel architecture, both within and across contexts of use. The system enables a knowledge-based storage mechanism for its representation. The system allows for extensions to various aspects of the user interface models it represents.

BRIEF DESCRIPTION OF THE DRAWINGS

The principles and operation of a system and a method according to the present invention may be better understood with reference to the drawings, and the following description, it being understood that these drawings are given for illustrative purposes only and are not meant to be limiting, wherein:

FIG. 15 illustrates a screen for displaying executable code that has been compiled from the canonic representation of an iView according to one embodiment of the present invention.

FIG. 16 illustrates a portal content that is displayed using the executable of code of FIG. 15 according to one embodiment of the present invention.

DETAILED DESCRIPTION OF THE INVENTION

The present invention relates to a modeling system or visual tool for creating a user interface (UI) without writing code. The system provides a means for defining user interfaces, including highly complex and dynamic user interfaces, in a manner that is independent of any implementation context. In a preferred embodiment of the invention, the modeling system leads from a user-friendly visual representation of the user interface, through progressively detailed specifications of structural and behavioral aspects of the user interface parts, until a rigorous definition of the user interface in its contexts of use is achieved. Using a visual representation of UI created by a designer, the modeling system automatically generates fully working user interface code.

Figure 1:
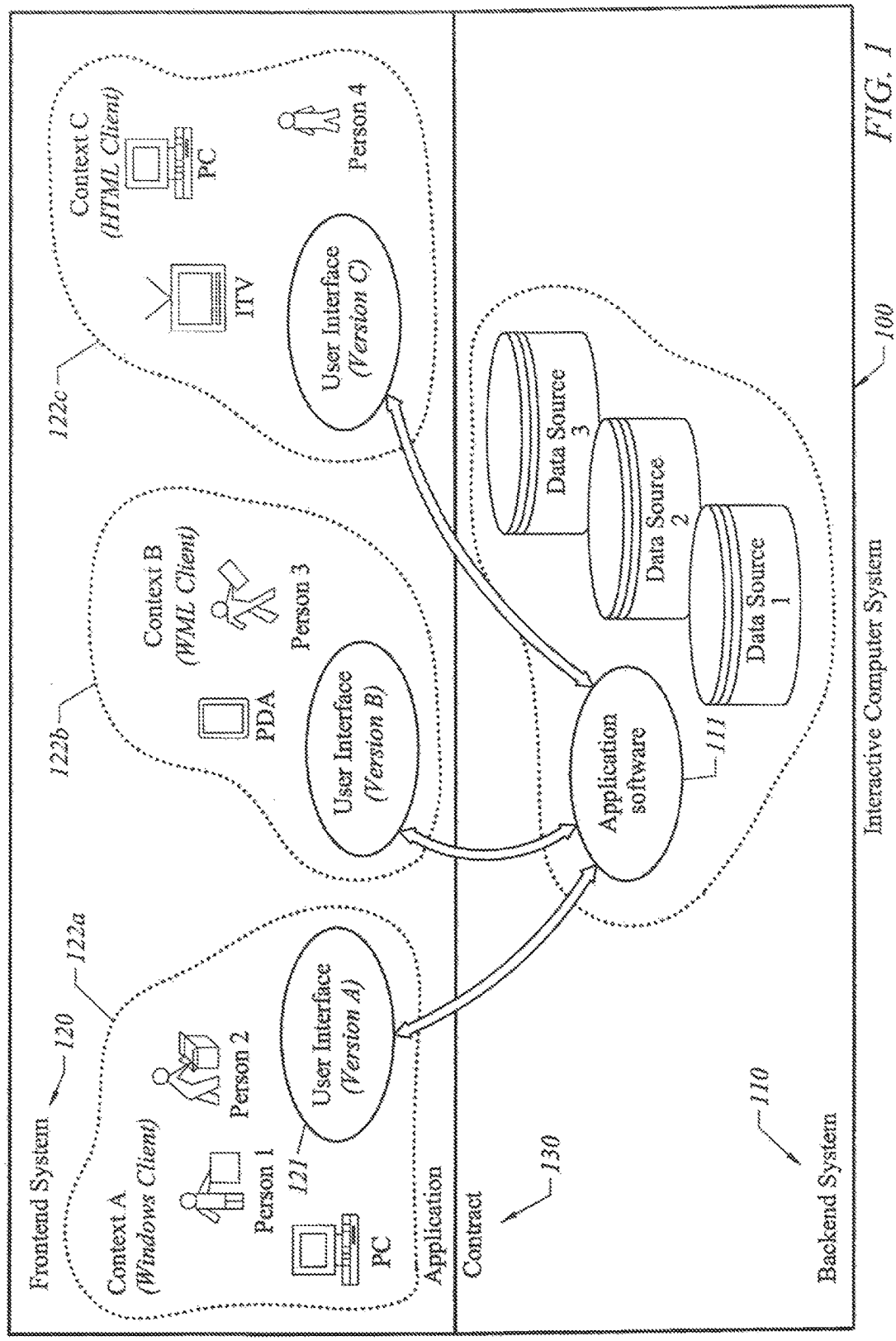
FIG. 1 is a diagram illustrating schematically an interactive computer system.

FIG. 1 illustrates a generalized diagram of an interactive computer system in a client-server environment. An interactive computer system (server) 100 serves an application to one or more users (clients) and can be generally divided into backend and frontend sub-systems 110 and 120.

The backend system 110 hosts the application and includes the application software 111 as well as any number of storage, networking, and server hardware. The application software is the program code that controls the backend system for storing, retrieving, processing, and communicating the application data. The application software can be executed either on a central processor, or distributed over any number of processors in a variety of architectures. The application software is also known in the art as the middle tier, or the business logic layer (BL). The data for the application are associated with database layer. Accordingly, the backend system 110 includes both the application and database layers.

The frontend system 120 is the portion of the interactive computer system responsible for the interaction between the users of the system and the application running on the backend system. The frontend system includes of the user interface software 121 and any number of input/output devices. The user interface software analyzes and interprets input, designs and renders output, and manages the interaction between the user and the application software. The user interface is also known in the art as the man-machine interface (MMI), the human-computer interface (HCI), or the presentation layer (PL). A wide range of user interfaces is manifested in the art: from simple, single-device, single-thread, single-user interfaces to complex multi-modal, multi-device, multi-threaded, and multi-user user interfaces.

A frontend system may include any number of user interface contexts, each a different combination of user types, input/output devices, and user interface technologies. For illustrative purposes, FIG. 1 shows three exemplary user interface contexts 122*a*, 122*b*, 122*c*. A user interface context 122 is defined in terms of user parameters (requirements, goals, and preferences), hardware parameters (screen size, memory size, network bandwidth, input devices), software parameters (graphics engine, programming language) and environmental parameters (surrounding noise, lighting conditions, user location).

Generally, developing a user interface requires numerous considerations. One needs to know what the user wants to do with the UI, define different tasks that the user may wish to perform, and consider different data formats to be processed at the backend system and the frontend system.

Accordingly, a particular implementation of user interface software depends on the context in which the user interface is used. Consequently, different user interface contexts result in different versions of the user interface software, written in potentially different programming languages, using different software libraries, and tailored for different user goals and requirements and for different device constraints. These user interface versions communicate eventually with the same application code on the backend system by passing information back and forth according to an application contract 130. Because of these complexities, it has been difficult to provide a visual tool that is capable of creating a generic UI software that is compatible with multiple platforms or incorporates business logic, or both.

As a result, the UI software is predominately based on programming, which is a slow, laborious, and error prone process. Further, since the user interface logic is buried in code, it is difficult to evolve and maintain it over time. Yet further, since each version of the user interface has to be separately coded, often with very small code reuse, the development and maintenance of the user interface becomes even more difficult due to versioning, logistics, and consistency concerns.

Figure 2:
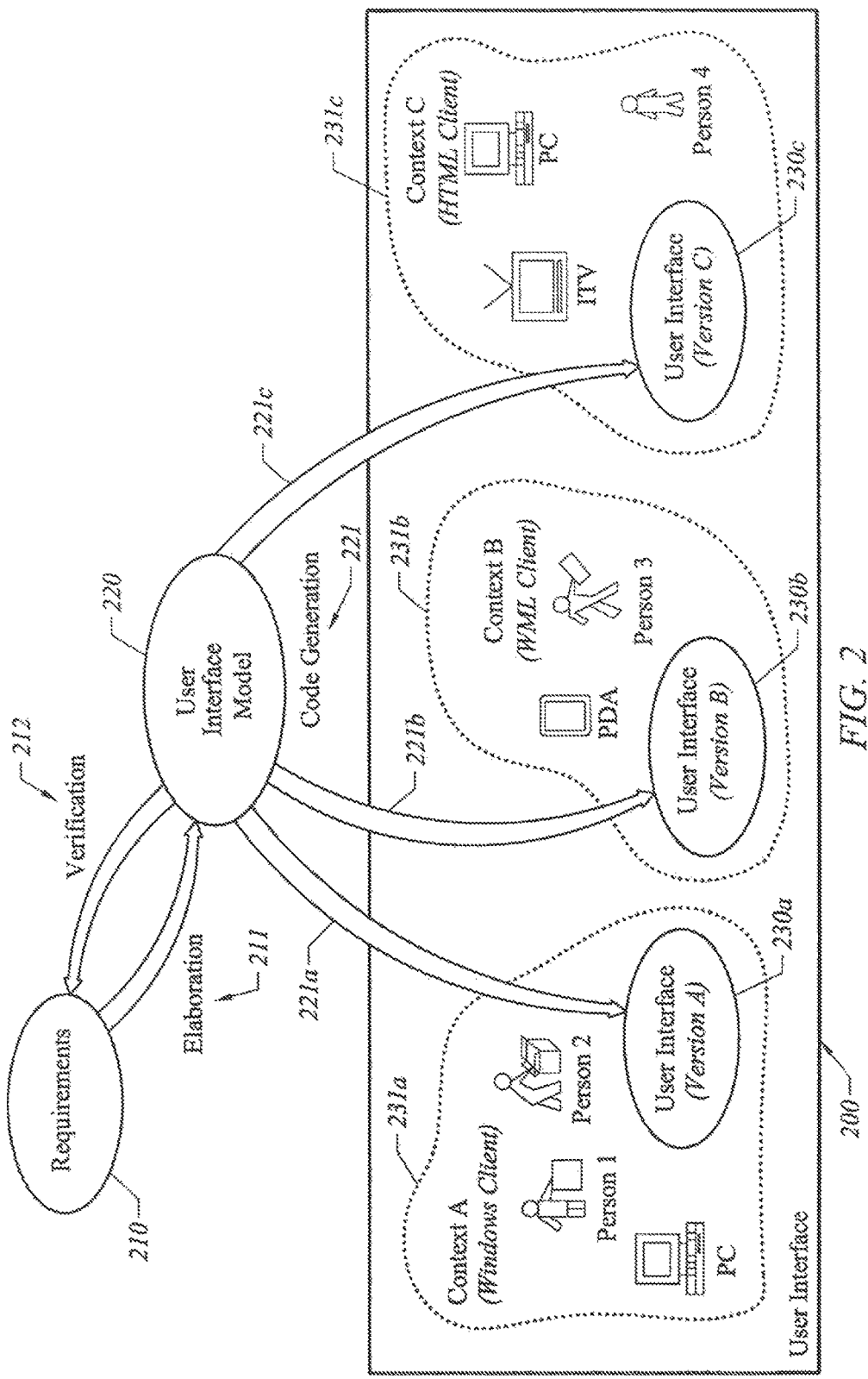
FIG. 2 is a diagram illustrating schematically a user interface model according to one embodiment of the present invention.

FIG. 2 illustrates a modeling system for user interface development that is based on modeling rather than programming according to one embodiment of the present invention. By eliminating the need for programming from the user interface development process, the present embodiment also eliminates most of the problems associated with programming, and thus provides a cost-effective means for the development and maintenance of user interfaces.

A user interface model 220 is a declarative specification of a user interface for a given application. The UI model 220 is a visual representation of UI that has been designed by a designer. In the present embodiment, the user interface model is independent of any implementation concerns such as hardware devices, computing platforms, programming languages, application protocols, company style guides, and so forth.

The user interface model is derived from the user and application requirements 210 through a design elaboration process 211. That is, a visual representation of the UI software is created using the user and application requirement. The user interface model is translated to user interface code 230*a*, 230*b*, and 230*c*, for each of the user interface contexts 231*a*, 231*b*, and 231*c* through a code generation processes 221*a*, 221*b*, and 221*c*. Accordingly, a single model or visual representation is used to create a plurality of different user interfaces for different contexts (e.g., a PC context, PDA context, and a television context).

The user interface model and the code that results from it are compared against the original requirements through a design verification process 212. Changes to the requirements can be quickly reflected by changes to the user interface model, which are promptly propagated to the user interface code.

The user interface model is comprehensive, with respect to a particular user interface context, if it captures all the different aspects of the user interface under the context in full detail. The user interface model is encompassing if it captures the definition of all the different user interface contexts that are required by the application. The user interface model is all-encompassing if it is encompassing and is comprehensive with respect to each and every user interface context.

The user interface model is executable if it captures sufficiently detailed information that enables generation of actually running user interface code. The user interface model need neither be comprehensive nor encompassing in order to be executable. In places where detailed information is missing from the user interface model, appropriate default behavior can be assumed by the code generation process so that a running, albeit incomplete, user interface code can still be generated.

In the present embodiment, the modeling system is provided with a plurality of basic building blocks and connectors for creating visual representations of UI. These building blocks, e.g., business functions, are selected and combined to each other. Missing pieces of information are supplied by the modeling system to simplify the modeling process. Otherwise, the system and process would be quite complicated and may not provide significant advantage over the manual programming.

For example, if a single line connecting two interactors (e.g., a patient lookup table view and a patient details form view) is drawn. This line signifies a data binding between the interactors; i.e., they are both synchronized views of the same dataset. Any changes effecting one of these interactors is immediately reflected in the other, without having to explicitly state all the possible different interactions. Accordingly, whenever a new record is selected in the patient lookup table view, it is immediately displayed in the patient details form view; whenever a field is edited in the form view, the corresponding cell in the table view is refreshed with the new value; whenever a new row is added to the table view, the form view displays a corresponding new and empty form; whenever a new query is made, resulting in a new dataset of patients, both views are updated accordingly. Because these behavioral aspects of the collaboration between the two views are implied from the protocol associated with the binding between them, they do not to be explicitly stated. thereby significantly simplifying the model."

The approach adopted by the present embodiment, accordingly, may require building initially a preliminary user interface model that is tested and progressively refined until a rigorous definition of the UI model is obtained. The resulting, completed UI model preferably is all-encompassing user interface model. This enables a quick and iterative user-centered design process that ultimately results in quality user interfaces that best match the user needs. Of course, simpler UI model may be obtained on the first try without the iterative process.

Figure 3A:
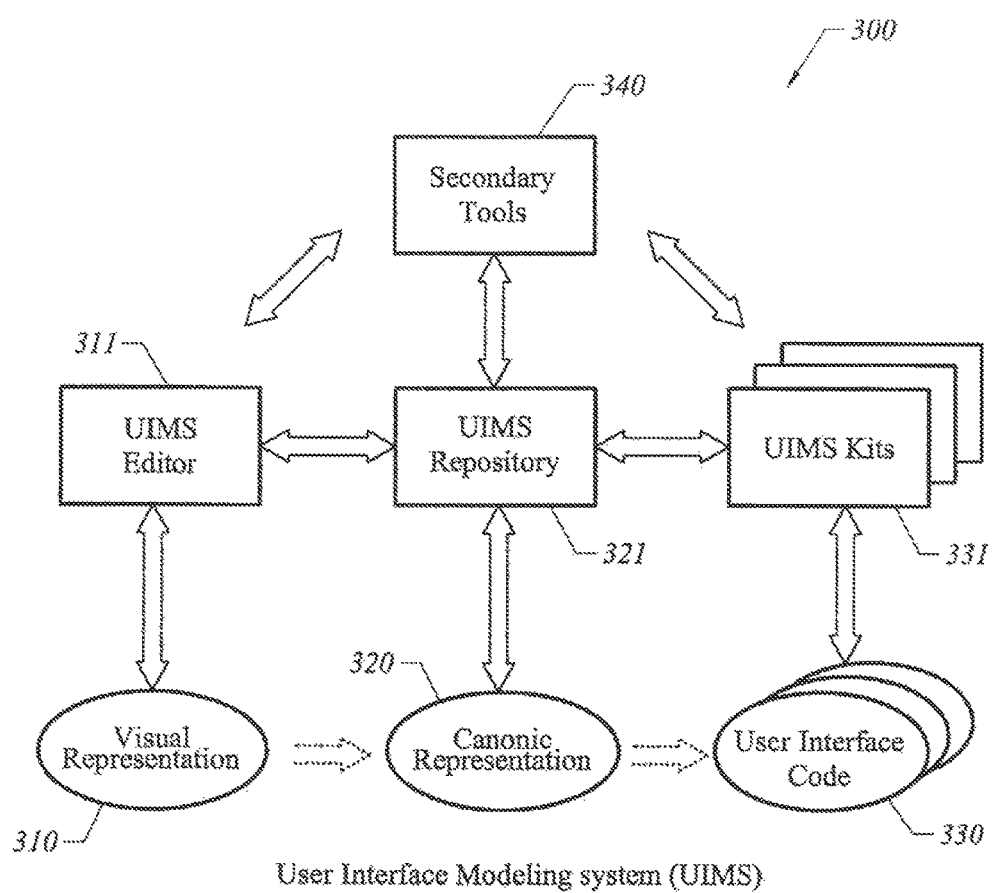
FIG. 3A is a diagram illustrating schematically a user interface modeling system according to one embodiment of the present invention.

FIG. 3A illustrates a user interface modeling system (UIMS) 300 according to one embodiment of the present invention. A user-friendly visual representation of the user interface model 310 is first created. A machine-readable canonic representation 320 of the user interface model is derived from the visual representation. The canonic representation is translated to user interface code 330, i.e., to executable code. In the present embodiment, the single UI model or visual representation 310 is converted to a single canonic representation, which may then be translated to UI codes for a plurality of different contexts or platforms.

Figure 3B:
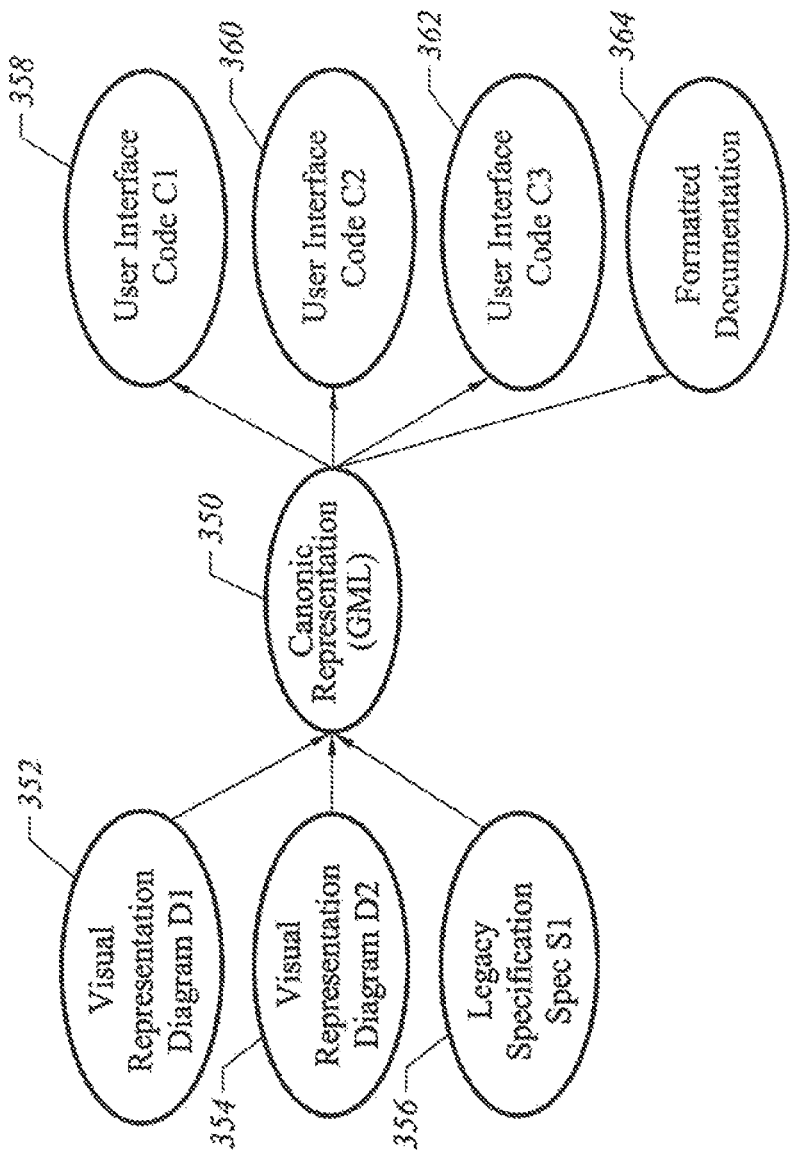
FIG. 3B illustrates a relationship amongst a plurality of visual representations, a canonic representation, and user interface codes according to one embodiment of the present invention.

Alternatively, as illustrated in FIG. 3B, a single canonic representation 350 may be derived from a plurality of visual representations 352 and 354 or from external legacy sources 356. The single canonic representation is then used to generate a plurality of user interface codes 358, 360, and 362 and other inputs 364 (e.g., formatted documentation). In certain instances, a visual representation may be converted to a plurality of canonic representations prior to generating a plurality of user interface codes.

The visual representation, in the form of simple and intuitive drawings, provides a user-friendly means for designing various aspects of the user interface model and for communicating a model design with other development teams. The visual representation is a drawing that specifies functions the UI are supposed to perform. Detailed specification sheets can be attached to the visual drawings to provide rigorous definition of structural and behavioral aspects of the user interface parts.

In the present embodiment, the visual representation 310 is created using a UIMS editor 311 (also referred to as "Storybook tool" or "Storyboard"). The editor is also used to edit and refine the created visual representation 310, enabling the human designer to elaborate the user interface model from the application and user-centered requirements and to continuously verify and update the model design.

The editor also translates the visual model representation to a canonical representation 320. The canonical representation provides a means for capturing the user interface model in a machine-readable way, i.e., the UI logic is not buried in the code unlike a manually written UI code. In one embodiment, the canonical representation is in the form of a proprietary language called GUIMachine Language (GML). In the present implementation, the GML is an XML-based language. The canonical representation may also be expressed in other machine-readable languages.

The canonical representation enables providing of a structured UIMS repository 321 for the user interface model, including support for purely organizational and knowledge management functions. The UIMS repository can be used as the source for code generation tools, as well as for tools that facilitate modifications to the model during the iterative user interface design process.

In addition, the UIMS repository produces a semantically rich source of user interface knowledge that can be exploited by secondary tools 340 in a variety of areas, such as: documentation generation, online help generation, undo/redo facilities, transactional facilities, error recovery facilities, drag and drop facilities, design critics (for verifying that the design satisfies specified properties), model simulators (for simulating end-user activities), and model verification tools.

One or more UIMS kits 331, in the form of pseudo-code or even actual program code, provide the means for generating running code from the canonic representation 320 of the user interface model. A kit contains the information and procedures necessary to map a user interface model to the program code and accompanying data structures that correctly implement the modeled user interface in a specific user interface context or group of contexts. Different kits are used for generating different instances of executable code of the UI model according to the technology platforms or contexts, where each kit is configured to read the canonic representation of the visual representation and output executable code for a particular context.

While it is anticipated that accompanying tools such as those described above will be developed to automate the modeling system, it should be nonetheless noted that one or more of the elements of the modeling system can be realized using manual means only. For example, the visual representation can be created by drawing diagrams using pen and pencil, the detailed specifications can be written by filling-in specification forms, and even the code generation can be accomplished using hand-coding techniques.

It should also be noted that not all the elements of the modeling system described above are required for an embodiment of the invention. For example, an embodiment including only the visual representation can be used for creating (non-executable) user interface models for early design and prototyping, and for communication with other development teams. Or, another embodiment including only the canonical representation and implementation kits can be used as the basis for legacy user interface transformation tools. It will be apparent to those of ordinary skill in the art that other embodiments of the present invention can be made without departing from this invention in its broader aspect.

In the present embodiment, the modeling system is based upon a common set of the model constructs that underlie the different representations of the model. The model constructs is explained using familiar movie terminology since a user interface resembles a movie in many ways.

A user interface, like a movie, tells a story to the observer. The storytelling unfolds through a sequence of defined scenes played out by actors. The actors in a scene act upon prescribed scripts and communicate with each other and with the environment. However, unlike a movie, which always tells the same story to all observers, a user interface may tell different stories to different users, or even to the same user. Therefore, a user interface may be portrayed as a sort of interactive and personalized movie.

Building on the movie metaphor, the modeling system structures a user interface model as a collection of one or more scenarios representing the possible ways the user interface can be used. A scenario is a use case—a way the user can use the system in order to accomplish a task or a set of tasks. Scenarios are derived from a user-centered requirements analysis and depend upon user types, user objectives, and user interface contexts.

Figure 4:
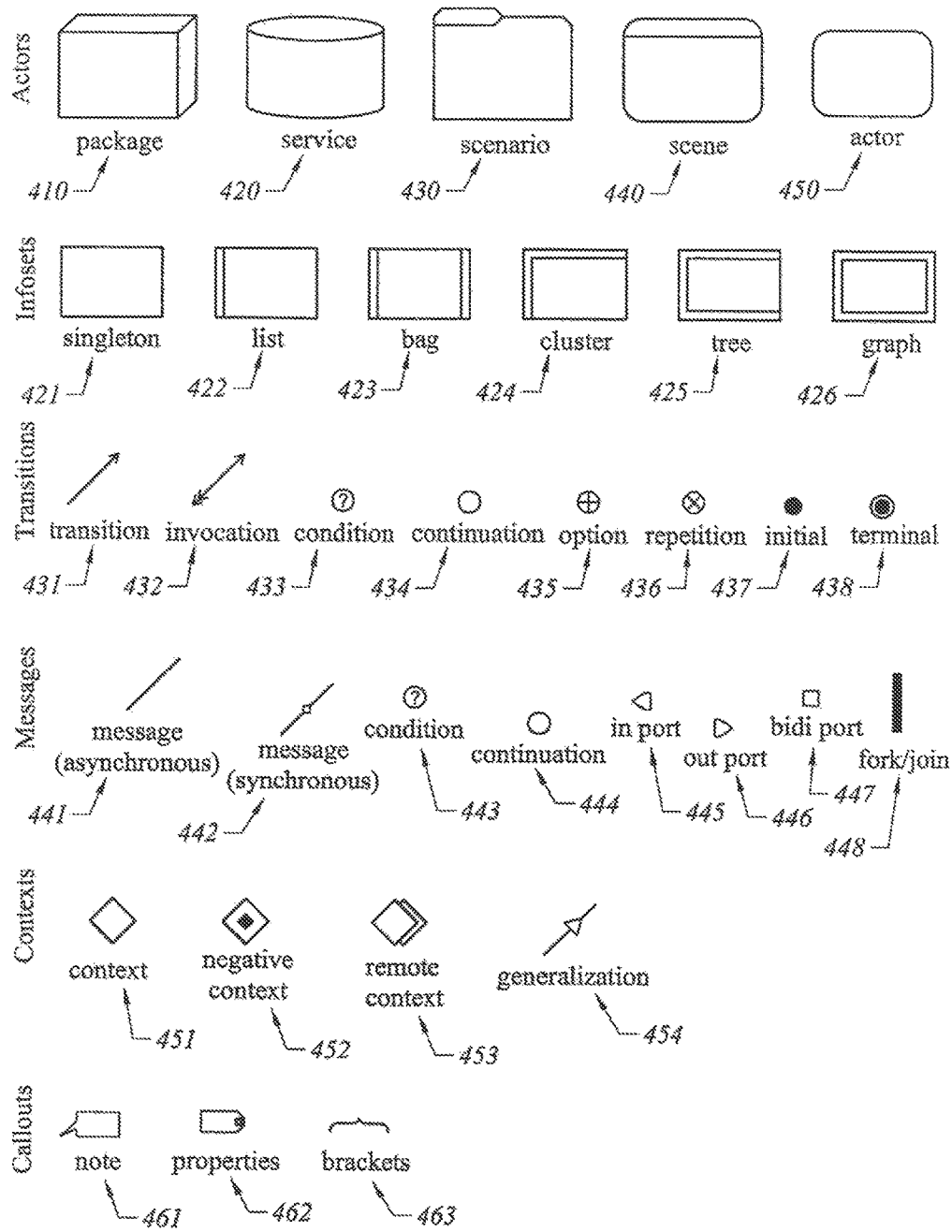
FIG. 4 is a diagram illustrating the symbolic constructs of the visual modeling language according to one embodiment of the present invention.

Referring to FIG. 4, a scenario 430 is made of one or more interleaved scenes 440, where each scene represents a set of tightly coupled activities that the user may perform at the same time. In the present embodiment, a new scenario instance is based on a scenario prototype with a predefined set of embedded scenes, i.e., based on UI pattern. Accordingly, the selection of a given scenario defines types of scenes that could be subsequently selected. When a scenario is executed, the scenes are played out sequentially so that exactly one scene is active at any point in time. The order in which the scenes are played out is not fixed and may be controlled by dynamic transitions, including conditions and repetitions. In another embodiment, a new scenario may be created from scratch and a desired combination of nested sub-scenes and sub-scenarios may be added to the created scenario.

A scene is composed of concurrently active and collaborating actors 450. Actors are specialized computational units that represent threads of activities. Actors have internal states, possess certain expertise (e.g., configured to perform predetermined tasks or functions), and can react to events (e.g., process data that has been received). Actors communicate with the user, with the underlying application, or with each other through messages. Actors process and react to messages according to behavioral scripts specified by the human designer.

For example, a user interface for a medical information system may include several scenarios such as: A) doctor reviews and edits the medical records of his patients from the clinic computer; B) doctor reviews and edits his appointment schedule from the clinic computer or from his personal computer at home; C) patient reviews his personal medical record from his personal computer at home; and, D) first-aid worker reviews a patient medical record on a mobile device in the ambulance. Each of these scenarios is a use case that describes how a particular group of users will use the system in a certain context.

Continuing the example, scenario A, in which a doctor reviews and edits the medical records of his patients, may include several scenes such as: A1) looking up patients by name; A2) browsing the medical records of a selected patient; A3) bringing up a patient medical record; A4) adding a new entry into the medical record of a selected patient; and so forth. Each of these scenes may be repeated any number of times during the said scenario, but there is a certain implicit ordering between the scenes. For instance, the doctor may add any number of entries into a patient medical record (A4), but he must first lookup (A1) and select (A2) the patient from the list of all his patients.

Still continuing the example, scene A1, in which a doctor looks up patients by name, may be composed of several actors such as: A1a) an actor that communicates with the user for obtaining the name search string; A1b) an actor that communicates with application for querying and retrieving the list of patients that match the given search name; and A1c) an actor for presenting the patients results list to the user.

In the present embodiment, a scene and a scenario are both composite actors, i.e., containers for other actors, including sub-scenes/sub-scenarios. A scene is a spatial composition. All elements contained in the scene are concurrently active or visible. The scene defines how the sub-elements are arranged in a display surface. A scenario is a temporal composition. Only one of the scenes in the scenario is active at a time. The scenario defines the transition flow by which control is passed from one scene to another. In one implementation, the scenarios and scenes are created from scratch according to specific application or user requirements.

In another implementation, the modeling system uses the pattern paradigm and provides scene and scenario prototypes. The scene and scenario prototypes are specialized types of scenes and scenarios that are provided with a fixed or well-known set of sub-elements, such as sub-scenes or actors. The designer then only needs to select from the predefined set the specific elements that he needs in a particular case and assign them with specific properties. This allows for reusing of often recurring model constructs and enables rapid model composition. A UIMS kit or kit extension can be used for providing a set of such preconfigured scene/scenario prototypes for a certain class of user interfaces or for a particular industry. In yet another implementation, the modeling system enables the designer to use the scene and scenario prototypes, as well as build the scenes and scenarios from scratch.

Figure 3C:
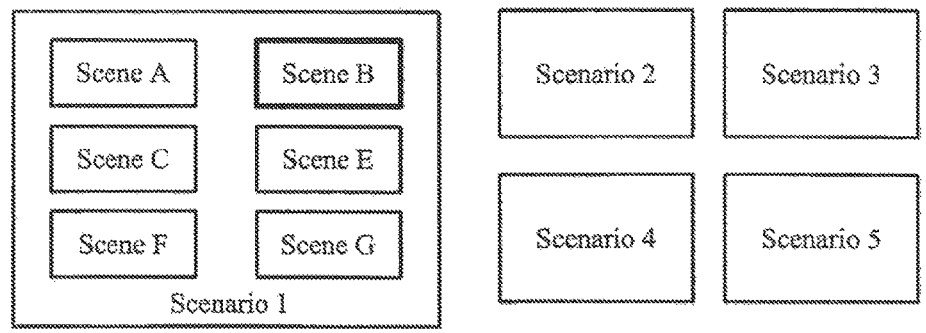
FIGS. 3C and 3D illustrates a modeling system based on a pattern paradigm according to one embodiment of the present invention.
Figure 3D:
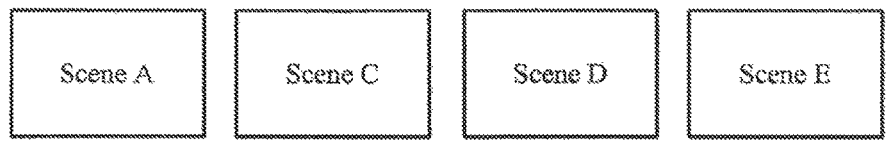
Figure 3D:
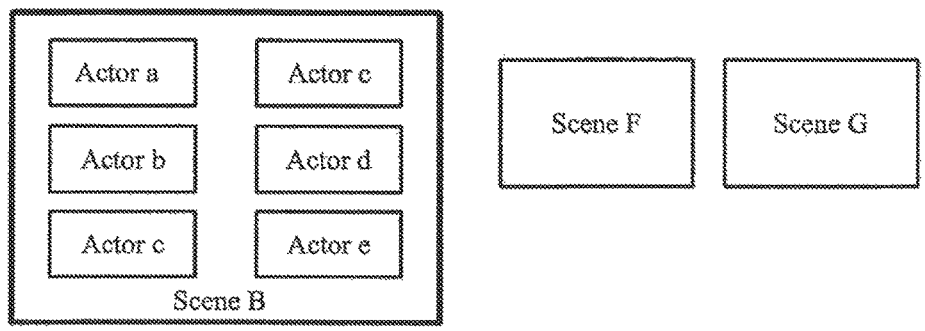

FIGS. 3C and 3D illustrate the modeling system based on the pattern paradigm according to one embodiment of the present invention. Scenario 1 is selected from a plurality of scenarios. Scenario 1 has a plurality of sub-elements or scenes. These scenes are scene prototypes or shells. The properties of scenario 1 are defined.

Next a first scene for the selected scenario is created by selecting scene B and defining its properties. Scene B has a plurality of sub-elements or actors. One or more of these actors are selected and their properties defined. The relationship between the selected actors are defined.

Once the first scene has been created, a second scene for the selected scenario is created by selecting another scene prototype (e.g., scene F) and repeating the steps above. The transition or relationship between the first and second scenes are defined, thereby creating a scenario having a plurality of scenes. The above steps may be repeated to add as many scenes as needed for the scenario or the visual representation.

In the present embodiment, the visual representation is a simple diagrammatic notation with which user interface models can be easily expressed. Most diagrams and some complex symbols are graphs containing nodes connected by paths. The information is mostly in the topology, not in the size or placement of the symbols. The visual relationship used to define the visual representation include: (i) connection (usually of lines to 2-d shapes); (ii) containment (of symbols by 2D shapes with boundaries); and (iii) attachment (one symbol being "near" another one on a diagram). These visual relationships map into connections of nodes in a graph, the parsed canonic form of the notation.

The visual notation is intended to be drawn on 2-dimensional surfaces. Some shapes are 2-dimensional projections of 3-d shapes (such as cubes), but they are still rendered as shapes on a 2-dimensional surface. There are basically three kinds of graphical constructs that are used in the visual notation: symbols, diagrams, and paths.

Symbols are atomic shapes that cannot be further decomposed in the visual notation. The symbols constitute the basic building blocks from which the model diagrams are constructed.

Paths are sequences of line segments whose endpoints are attached. Conceptually a path is a single topological entity, although its segments may be manipulated graphically. A segment may not exist apart from its path. Paths are generally attached to symbols at both ends, so that there are no dangling lines.

Diagrams are bounded areas that hold collections of symbols that are connected by paths. A diagram is in itself a symbol that can be placed inside another diagram. The visual representation is therefore a tree of nested diagrams, where the root diagram represents the entire user interface model.

The visual notation, when written on paper, is called the static visual notation. The visual notation, when presented through the UIMS designer, is called the dynamic visual notation. The static and dynamic visual notations are semantically equivalent. While the dynamic notation doesn't add any new information it offers capabilities like zooming, expanding, navigating, filtering, and other interaction and visualization techniques that make it easier to review and manipulate the visual notation.

Elements in the visual representation are uniquely identifiable. This make it possible to reference the elements in expressions and rules from other elements, in the same diagram or in other diagrams. An element is assigned a unique name within the diagram that owns it. The fully qualified identifier of an element is formed by concatenating the element name to its diagram identifier and all its ancestors.

FIG. 4 illustrates specific symbols used by the visual representation according to one embodiment of the present invention. Those skilled in the art will realize that the visual representation can be constructed using other symbolic vocabularies. Accordingly, the invention is not limited to the specific vocabulary of symbols presented herein.

Infosets are the information blocks that are passed between the user interface and the application according to the application contract. An information service 420 diagram is used for defining a service available to the user interface through the application contract. The infosets that are provided by a particular service are drawn inside its respective diagram. A service may be nested inside another service. Also, a service may be used as the prototype for defining other services through inheritance.

An infoset is a structured collection of information objects. The infoset symbol indicates the structure of the infoset. Some common infoset structures include a singleton 421 (a collection holding exactly one object), a list 422 (an ordered list of objects), a bag 423 (an unordered list of objects), a cluster 424 (a nested collection of objects), a tree 425 (a hierarchic collection of objects), and a graph 426 (a linked collection of objects).

The objects in an infoset are instances of object types. An object type represents a class of similar objects and defines their data fields structure. An object type is drawn using the same symbol as a singleton 421. An object type can serve as the prototype for defining other object types through inheritance. An infoset may contain objects that are instances of any number of object types. The symbols of the object types that are allowed in an infoset are drawn inside the infoset symbol.

The infoset regularity is a measure of the mix of object types that are valid for inclusion in an infoset. A regular infoset may only contain objects that are all instances of the same object type. An irregular infoset may contain objects that instances of different object types. If all the object types that are allowed in an infoset are inherited from the same base object type, the infoset is considered semi-regular.

An infoset is in itself an object type and thus can be included inside another infoset, enabling the definition of arbitrarily complex infoset structures. Visually, this is indicated by drawing the contained infoset symbol inside the containing infoset symbol.

The manner in which object types and infosets are drawn results in a uniquely tessellated box shape that reflects the structure and regularity of the infoset. This shape is called the infoshape—an abstract signature of the structural shape of an infoset. Actors are usually designed for working with specific infoshapes (e.g., a tableview interactor designed for regular list infosets).

An infoset is a passive object, in contrast to an actor that is an active object. An infoset is always owned by exactly one actor in the present embodiment; therefore, the infoset symbol is drawn inside the symbol of its owning actor. Conversely, an actor always owns exactly one infoset in the present embodiment. The infoset can be accessed directly only by the actor that owns it.

Actors 450 represent active concurrent entities with specific responsibilities. Concurrency means that an actor can exist and operate in parallel with other actors in the same environment. An actor's implementation is hidden from its environment and other actors by an encapsulation shell.

In order for an actor to communicate with its environment, its encapsulation shell has openings called ports through which information can flow in or out. Visually, the actor ports are drawn on the edge of the actor. The direction of a port is indicated by its symbol: in an incoming port 445 the information flows into the actor; in an outgoing port 446 the information flows out of the actor; and in a bi-directional port 447 the information flow in both directions.

The information that is exchanged is packaged into discrete units called messages. The messages are instances of infosets. Generally, the messages are the sole means of communication available to an actor. Because of the encapsulation shell, the behavior of an actor can only be deduced from the outside by observing the flow of messages on its ports. Conversely, an actor's perception of its surroundings is limited to the information received through its ports.

Each port on an actor represents one specialized interface of the actor. One of the attributes of a port is its associated protocol, which includes a set of valid message types which are allowed to pass through the port, and a set of valid message exchange sequences on that port.

A messages binding is used to explicitly represent and constrain the valid communication relationships between actors. Two actors in the same layer can communicate directly if they have a binding between them. A binding is an abstraction of an underlying communication channel which carries messages from one actor to another. Bindings can be either asynchronous 441 or synchronous 442. Asynchronous message binding in non-blocking; i.e., after sending a message, the sender simply continues its activity. In case of synchronous message binding, the sender is blocked until the receiver replies with a message of its own.

Bindings is generally drawn between ports that have mutually compatible protocols. In general, bindings do not indicate the direction of communications since this can be inferred from the directionality of the ports. A condition connector 443 may be used to define conditional bindings that are routed to different actors depending on some dynamic rules. A continuation connector 444 may be used to define bindings that branch to remote areas of the diagram. The continuation connector may also be used to define bindings that branch to more than one actor at the same time.

Actors are defined through prototype-based inheritance. The designer chooses an appropriate actor prototype from the UIMS kit and modifies its behavior as needed by specifying properties and by scripting reactions. Actors that are defined directly from actor prototypes in this way are called atomic actors. An atomic actor in itself can serve as the prototype for another atomic actor. By providing a new kit or extending an existing kit, the selection of available actors can be tailored or expanded to meet various customized requirements.

Some commonly occurring atomic actor prototypes include: infoactor—an actor that communicates with the underlying application for obtaining or modifying an infoset; interactor—an actor that interacts with the user for viewing or editing an infoset; presenter—an actor that is used to control the geometry and style of presentation of an interactor; transformer—an actor that is used to transform one or more infosets into a new infoset using set operations; collaborator—an actor that is used to mediate between parallel actor instances in multi-user environments.

An actor can be instantiated any number of times in a running user interface, all instances sharing the same behavior, but each instance maintains its own internal state. For example, a table view actor is a frequently used actor prototype. It represents the generic ability to present to the user a flat list of similar objects, with some general functionalities such as scrolling and selecting. An actor for presenting a list of patients can be defined based on the table view actor by specifying the mapping between patient attributes and table columns. Different instances of this actor, either on the same workstation or on distinct workstations, may be used for displaying results of patient lookup queries. All instances show tables with the same column structure, but each table displays a distinct list of patient records and can be scrolled and selected separately.

When a task is too complex or too rich to be effectively represented by a single atomic actor, it is then possible to use a scene 440 diagram to decompose it into a collection of concurrent actors. Each of the contained actors is responsible for a subset of the overall functionality. Message bindings between the actors' ports define how the actors collaborate in order to combine their specific functionalities into the overall task functionality.

A scene is in itself an actor. The actors contained in a scene may, in turn, be further decomposed into sub-scenes in a similar fashion. This process of decomposition may be carried out to an arbitrary level. Scenes may also be used as prototypes for defining other scenes through inheritance.

Ports can be drawn on the edge of the scene diagram to define the interfaces of the scene with higher layers of the model. The scene ports can be connected to internal component actors which is equivalent to the concept of delegation. When a scene is viewed from higher layers of the model, only its ports are visible—the internal structure of the scene, including its component actors and their message bindings, is hidden.

When the structure or behavior of a task can vary dynamically, it is then possible to use a scenario 430 diagram to decompose it into a collection of interleaved scenes. Each of the scenes in the scenario represents a particular task/dialogue state. In the present embodiment, exactly one state is active at any point in time.

A transition arrows 431 are drawn between the scenario states to indicate the possible state transitions, and the events that trigger these transitions. The direction of the transition is indicated by the arrow head. An initial and terminal states 437 and 438 indicate where the scenario starts and ends, respectively. An invocation 432 is a special type of transition that executes a target state and returns to the source state once the target state terminates. It is a short-cut notation used in place of drawing pair of opposite-facing transitions between the two states.

The condition connector 433 may be used to define conditional transitions that branch to different states depending on some dynamic rules. The continuation connector 434 may be used to define transitions that branch to remote areas of the diagram. The option connector 435 may be used to define transitions that branch to one of a group of optional states. The repetition connector 435 may be used to define transitions that are repeated until some dynamic condition is met.

A scenario is in itself an actor. The scenes contained in a scenario may, in turn, be further decomposed into sub-scenarios or sub-scenes in a similar fashion. This process of decomposition may be carried out to an arbitrary level. Scenarios may also be used as prototypes for defining other scenarios through inheritance.

Ports can be drawn on the edge of the scenario diagram to define the interfaces of the scenario with higher layers of the model. The scenario ports are connected to the contained scenes by using the fork/join 448 connector. When a scenario is viewed from higher layers of the model, only its ports are visible—the internal structure of the scenario, including its states and their transitions, is hidden.

A context selector 451 represents a particular user interface context or group of contexts. Context selectors can be related by the generalization 454 arrow to create hierarchies according to device classes or user roles. When a context selector is applied to an element it restricts the use of the element by the model only to the user interfaces that belong to that context.

A context selector is applied to an element by placing it inside the element symbol. More than one context selector can be applied to the same element. Multiple context selectors are OR combined. The negative context 452 selector can be used to remove a context from an element.

The context selectors that are applied to an element are inherited by all its contained elements. Additional context selectors can be applied over contained elements, but only in a more restricting manner. This allows creation of a unified user interface model where the higher layers are shared by multiple contexts, and the lower layers are restricted to specific contexts.

A remote context 453 selector is used to designate an element as belonging to remote instance of the user interface. By using remote contexts it is possible to coordinate messages and transitions between multiple users in a multi-user environment.

The package 410 diagram is used to group together any model elements for organizational purposes. A package can hold any element, including the other packages. Packages are usually used for organizing model element definitions for reusability purposes.

A note 461 may be attached to any diagram element for documentation purposes. A brackets 463 symbol may be used to add a note to a group of diagram elements. A properties 462 symbol may be attached to any diagram element to reference a corresponding properties sheet holding additional specification details about the element.

An actor defines the unit for functional modularity. It is possible to modify the internal structure or behavior of an actor without affecting the rest of the model. Actors which implement complex functionality are broken down into component actors, each responsible for a subset of the overall functionality. This process of decomposition is in fact functional decomposition.

An actor also defines the unit for inheritance and reuse. It is possible to use both atomic and compound actors as prototypes for other actors. Since an actor has exactly one prototype, it is implied that actors use single inheritance. Multiple inheritance is not supported by the model in the present embodiment. The preferred way, instead of using multiple inheritance, is to incorporate other actors into the actor and pass through part of their interfaces as the actor's own interface.

An actor also defines the unit for processing. Every actor in a model is an active object with its own thread of execution. The state of an actor is defined recursively as follows: the state of an atomic actor is its own state; the state of a compound scene actor is the union of the states of all actors (either atomic or compound) that are members of the scene; the state of a compound scenario actor is the state of the currently active scene. Since a state is internally maintained by an actor, the interaction with the actor can be suspended and resumed at will.

It is thus possible to execute an actor on any processor on either the server or any of the client workstations. An executing actor instance can even be moved to a different processor from the processor where it was created. The location where actor instances are executed is an implementation concern and does not affect the modeling system. Therefore, the same user interface model can be used to generate a user interface that is executed entirely on the client workstation, an equivalent user interface that is executed entirely on the application server, as well as any combination in between.

When viewed in this manner, the user interface model is ultimately a collection of atomic actors that are recursively composed either spatially (through scenes) or temporally (through scenarios). The state of the user interface, which is the state of the top level scenario, is made of the current configuration of active actors and their individual states.

By distributing the state of interaction among concurrent and collaborating actors the modeling system creates a highly parallel and modular organization. This is the key enabling factor for handling complex user interfaces with multiple modalities, access channels, dialogue threads, and user types, and for withstanding the constant changes that result from the iterative nature of user interface design.

Figure 5:
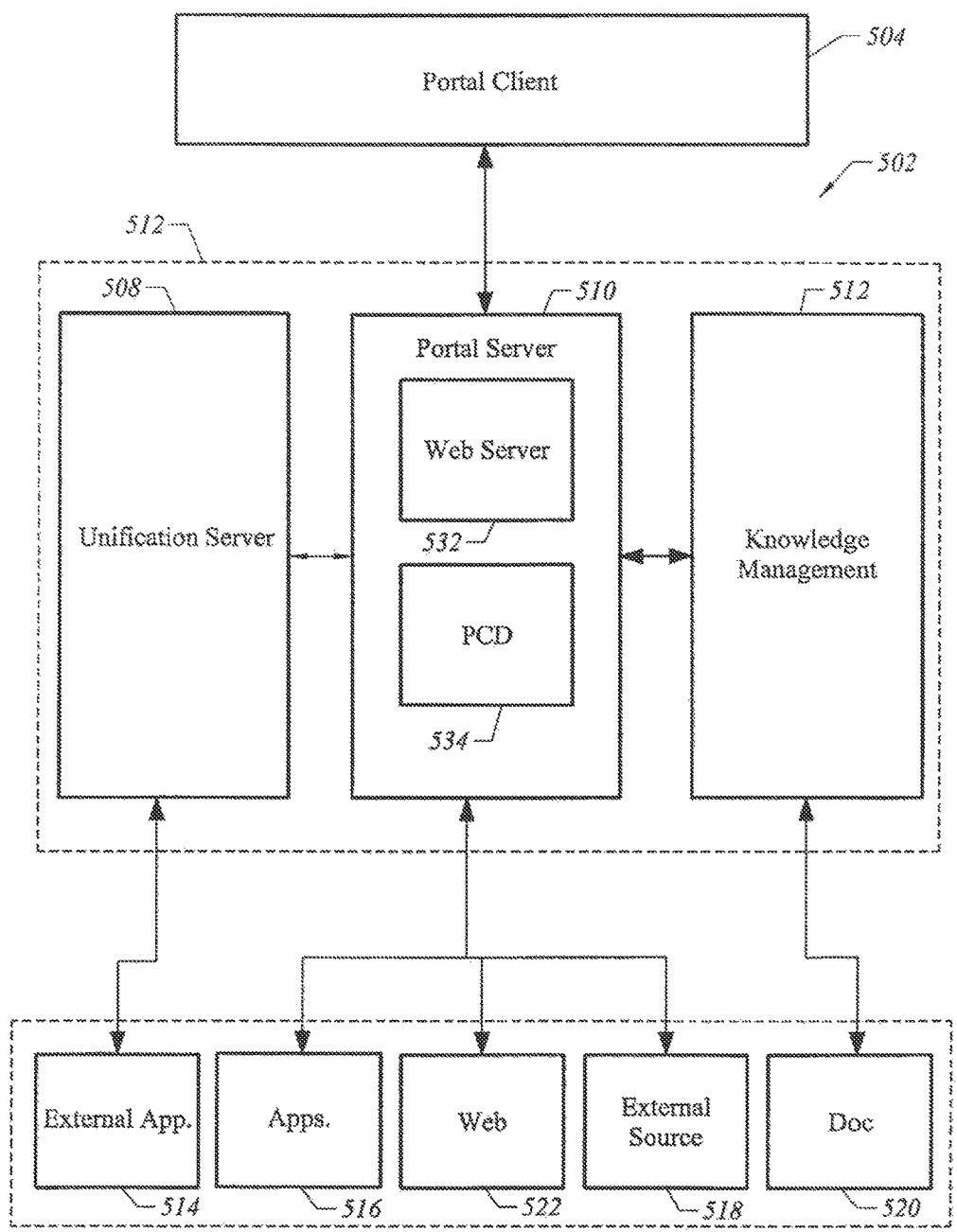
FIG. 5 illustrates an enterprise portal system wherein a modeling system may be implemented according to one embodiment of the present invention.

FIG. 5 illustrates an enterprise portal 502 wherein the modeling system is provided according to one embodiment of the present invention. The portal 502 couples a client 504 to a plurality of information sources 506. The client 504 is associated with a frontend system, and the information sources 506 are associated with the backend system. The backend system includes the application layer that connects the client and the information sources.

The client 504 may be a personal computer (PC) that is linked to the portal 502 via the Internet, intranet, wide area network, local area network, or the like. The portal is configured to provide users with a common entryway to various applications and information.

In the present embodiment, the portal 502 integrates a plurality of different technologies, enabling users to access applications and information that are both internal and external to the enterprise. The information sources 506 include an external application 514 (with respect to a given enterprise), internal application 516 (with respect to the given enterprise), external document source 518, internal document source 520, and Web 522.

The portal includes a unification server 508, a portal server 510, and a knowledge management 512. The unification server is configured to provide a business unification layer that enables dynamic integration of both applications and information from various sources. The business unification layer enables the creation of a unified object model, so that a portal user may dynamically integrate applications and information. Logical business objects, provided in component systems, are used to create a unification object model that is stored in a repository. The objects are mapped to each other by links, so that users are able to dynamically pass content from one information source to another.

The logical business objects are used to represent a thing, concept, process or event in operation, management, planning or accounting of an organization. Each business object specify attributes, relationships, and actions/events. For example, the business objects may be used to represent purchase orders, vendors, and users of a system.

The portal server includes a web server 532 that communicates with the client and a portal content directory (PCD) 534 that includes a plurality of presentation components, e.g., iViews. The PCD includes the UIMS repository 321 and the UIMS kits 331 in one implementation. The PCD is a file-based directory that also includes roles and the systems with which the portal is to interact. In one implementation, the PCD runs on a Java 2 Enterprise Edition™-compliant application server.

The knowledge management (KM) 510 is a set of services for managing knowledge and collaboration. The KM 510 provides a platform to harmonize various business tools under one business management platform regardless of the physical location of data. In one implementation, the KM includes a repository framework that manages the content of documents and corresponding document attributes, classification engine that organizes contents in folder or tree structures, and other components for managing information.

Figure 6:
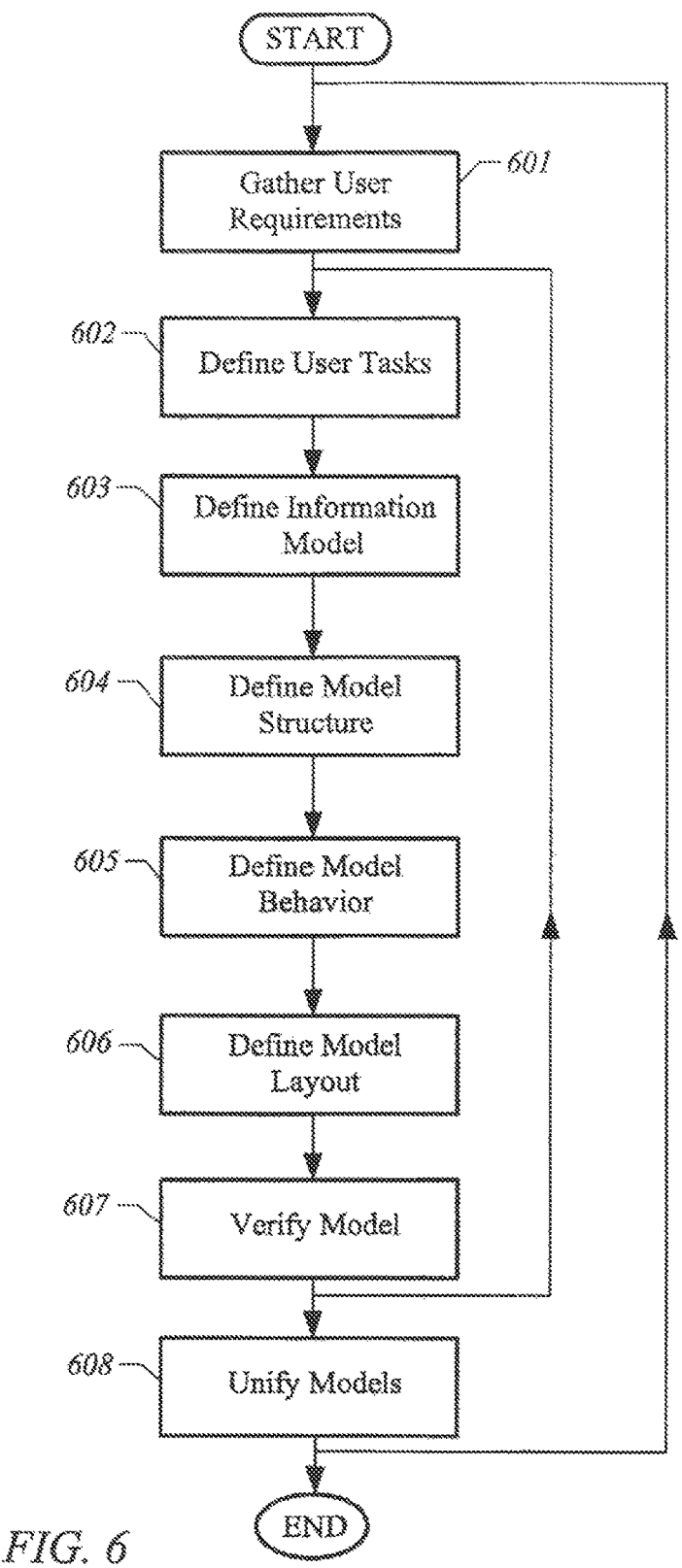
FIG. 6 is a flow diagram illustrating a method for designing a model of a user interface according to one embodiment of the present invention.

FIG. 6 illustrates a process 600 for creating a user interface model according to one embodiment of the present invention. At a step 601, the user requirements for a particular context (e.g., context C) of the user interface is gathered according to various ways and available methodologies. Based on the user requirements, the user task model is defined for the user interface context C, i.e., determine what steps are needed to satisfy the requirements (step 602). The user task model is a hierarchical decomposition of the tasks (functions) that are required to support the user activities within the user interface context. Each task may be either an atomic task or a composite task made of parallel or interleaved sub tasks. User tasks may be defined for multiple contexts.

An information model is defined (step 603), e.g., application/business functions are selected and called. This step involves analyzing the business layer of the application in any of the available methodologies, identifying the information services and objects that are relevant for the user tasks from step 602, and defining their structure and contract. Based on that the information model is defined using service diagrams and infoset symbols.

Based on the user tasks from step 602, the model structure is defined using nested diagrams of scenarios and scenes (step 604), e.g., scenarios, scenes, and actors are selected. A task that is comprised of interleaved sub tasks is mapped into a scenario diagram, while a task that is comprised of parallel active sub tasks is mapped into a scene diagram. The atomic tasks are mapped into appropriate atomic actors.

The behavioral aspects of the scenarios, scenes, and actors that were identified in step 504 are defined in more detail (step 605), e.g., the relationships among the selected scenarios, scenes, and actors are defined. For each scenario, the associated transition flows are defined. For each scene, the exact message bindings and ports are defined. Actor properties, expressions and dynamic rules are defined where needed.

Each scenario, scene, and actor that was identified in step 604 is mapped to an appropriate display surface and its layout is defined (step 606), e.g., the layout views of the gathered information is defined. Styles and graphs are customized where needed. The model is verified by simulating or generating the user interface and comparing against the user requirements gathered in step 601. Steps 602-606 are repeated as many times as needed to refine the model until the user requirements are achieved. Step 601-607 are repeated for each context that needs to be supported by the user interface.

The modeling system described above may be used for creating user interfaces that may be used in widely divergent contexts, in both simple and complex environments. The present inventor has successfully implemented the present modeling system to an enterprise portal environment, which includes multiple layers of servers and computers dedicated for specific functions. The modeling system that has been implemented in an enterprise portal context is referred to as a GUIMachine ("GM") modeling system.

The GM modeling system is a visual tool that enables UIs to be developed quickly and easily by dragging and dropping visual objects and establishing relationship amongst them. The present tool is operable to connect to or work on a business layer, rather than work directly with a database. Accordingly, the tool is configured to read and understand metadata (or the structure of database) and process data at the business or application layer to preserve the business logic.

For example, the tool may be used to track the lifecycle of the sales order that is part of the business layer and is not part of the database. The business layer determines and stores such information in the selected tables in appropriate formats. Accordingly, the present visual tool connects to the business layer to incorporate business function modules or components, e.g., Remote Function Calls ("RFC") and Business Application Program Interfaces ("BAPIs"). The business function component is a reusable application component that sits on the business layer and includes business logic.

The visual tool is a pattern-based tool that enables rapid and efficient composition of a user interface model based on a pre-configured selection of user interface patterns. The following steps are an example of a well-known user interface pattern called the "master-details" pattern: (1) obtain data for all customers of a Company ABC, (2) optionally filter and sort the customers data by some criteria, (3) display the results in a tabular view—this is the master view, (4) whenever a particular customer is selected in the master view, obtain the orders data for that customer, and (5) display the orders in a secondary table view—this is the details view. The same master-details pattern can be recognized in many examples of user interfaces—all sharing the same concept of a master-view with one or more linked details-views, but each potentially substituting different datasets in the master and the details views.

The visual tool may or may not be associated with any given model. A model includes one or more packages that are tailored for particular business solutions. The package include one or more pages that in turn includes a plurality of integrated views (iViews). iViews are portal presentation components or portal snippets that retrieve data from applications, stored documents, or the Internets, and display the retrieved data on the client machine as portal content.

Figure 7A:
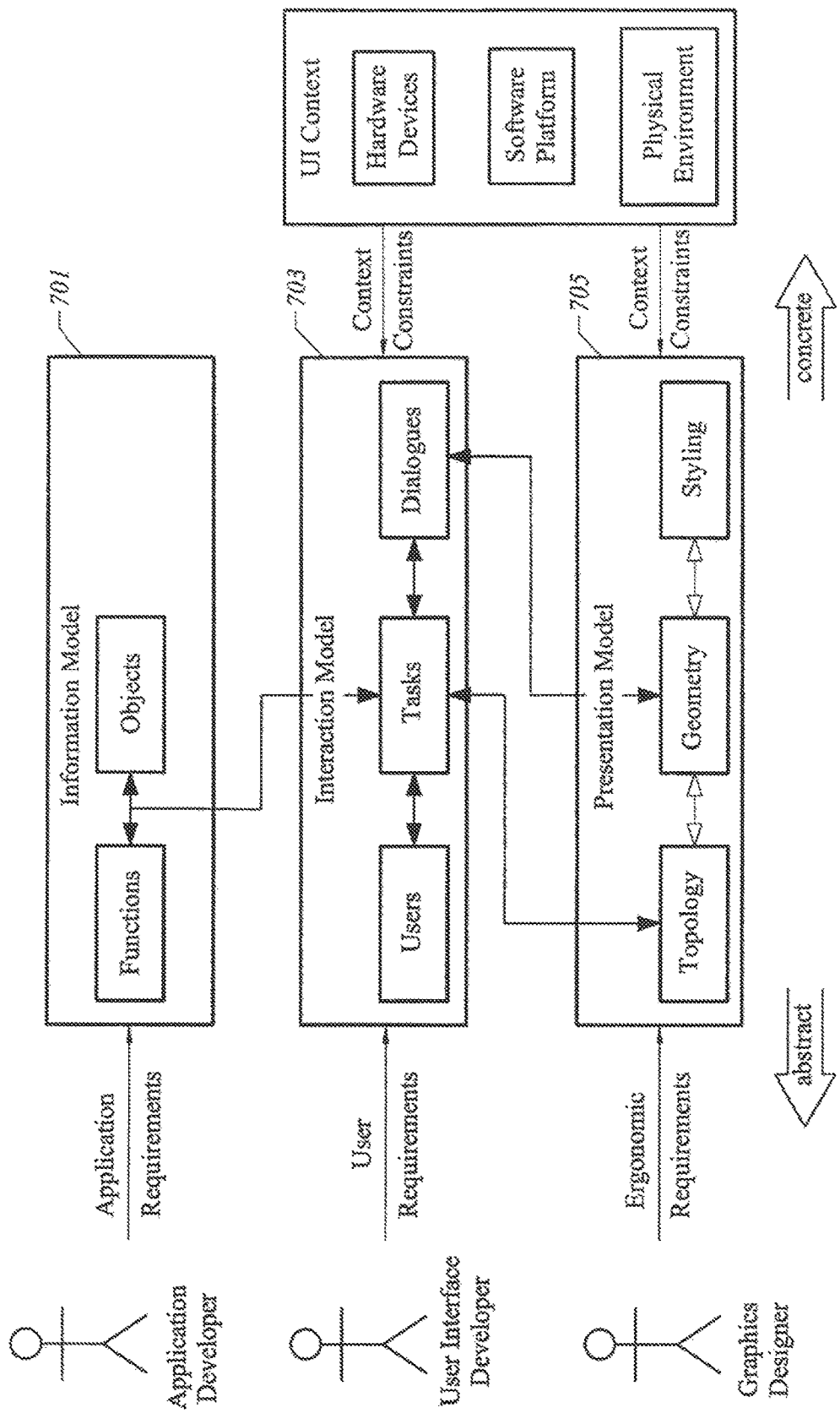
FIG. 7A illustrates modeling layers of a canonic representation of a modeling system according to one embodiment of the present invention.

FIG. 7A illustrates modeling layers of a canonic representation of the GM modeling system according to one embodiment of the present invention. The canonic representation includes three main layers: an information layer 701, an interaction model layer 703, and a presentation model layer 705. The information model layer 701 defines the information objects that can be received or sent to the underlying back-end application and the functions that can be called. This actually defines the contract or protocol between the user interface and the underlying application. The information model is derived from the application specifications.

The interaction model layer 703 defines the types of users that are expected to use the user interface, the tasks that they are supposed to accomplish by using the user interface, and the specific user interface dialogues that are required for carrying out each task. The interaction layer is derived from the information model layer and from user requirements analysis.

The presentation model layer 705 defines how the user interface will appear, including topology (how elements are nested within each other), geometry (how elements are arranged on the display surface), and styling (what colors, fonts, graphics, etc. to use). The presentation model layer is derived from the interaction layer but also depends on ergonomic requirements as well as other requirements such as branding and company style guides.

All the above model layers further depend on the user interface context model, which is a collection of hardware, software, and physical parameters that collectively define a user interface context. The user interface context model can impose constraints on the other model layers due to limiting factors such as screen size, existence of input/output devices, and the like.

In one implementation, the formal model layers are not explicitly expressed in order to simplify the representation and make the canonic representation more manageable. Rather each actor can be thought of as having three facets: information, interaction, and presentation facets. The three facets of an actor are integrated within the actor, but the actors themselves are loosely coupled. This results in a distributed organization of the modeling layers that allows for a parallel architecture and allows for quick and incremental modifications to the model, as explained below in more details.

Figures 7B, 7C:
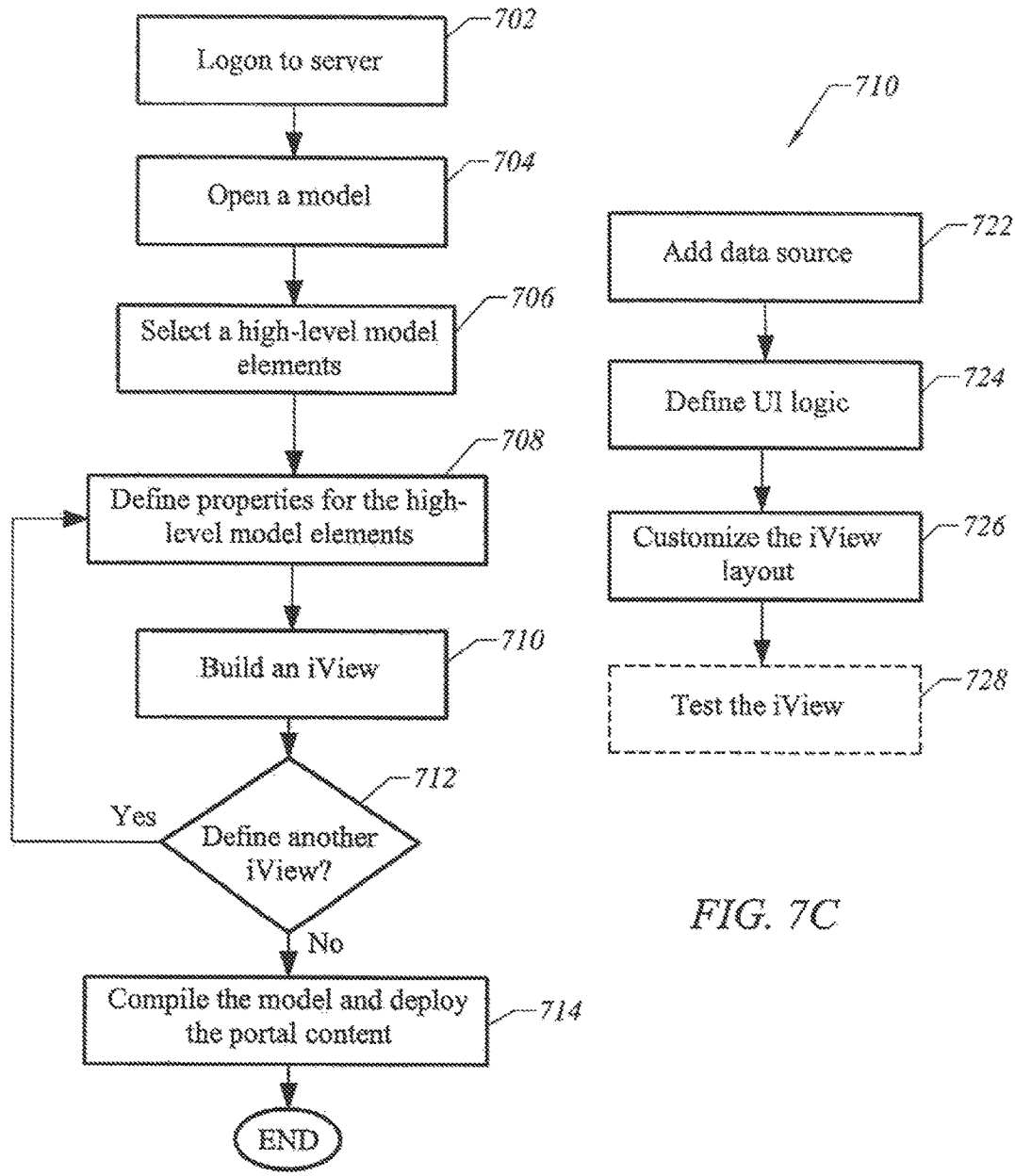
FIG. 7B is a flowchart illustrating a method for designing a user interface for use in a enterprise portal environment according to one embodiment of the present invention.
FIG. 7C is a flowchart illustrating a method for building a portal presentation component according to one embodiment of the present invention.

FIG. 7B illustrates a process 700 for creating a user interface using a GM modeling system without manual coding according to one embodiment of the present invention. The GM modeling system creates the user interfaces that incorporate application logic to access various applications and information sources associated with an enterprise portal. The process 700 is explained below using FIGS. 8-16, which are exemplary screenshots of the UI modeling system.

The process 700 begins when a designer logon to the portal server 510 from the portal client 504 to access the UI modeling system (step 702). In one embodiment, the modeling system is provided by a dedicated server, i.e., GUIMachine server ("GM server").

The modeling system or GM Storyboard is thereby opened. A screen 802 (FIG. 8) appears when the designer logs on to the GM Storyboard. The screen 802 includes a workspace 804 and a task panel 808. The workspace is where the visual representation of UI is designed and displayed. The workspace includes a design tab, a layout tab, a preview tab, and a source tab. The design tab is selected to design the UI on the workspace. The layout tab is used to customize the layout of iViews. The preview tab is used to preview and validate the logic of iViews. The source tab is used to view the GUIMachine Language ("GML") code that is automatically generated by the GM Storyboard. The GML code corresponds to the canonic representation 320.

The task panel 806 displays the tools relevant to the task that is being performed on the workspace. The task panel has a plurality of states for displaying different sets of tools. These states include "Get Started," "Model Explorer," "Logic Elements," "Layout Styles," Field Definition," "Element Properties," Data Sources," "Code Compiler," and "Model Debugger." The Get Started state appears when no model is opened in the workspace and allows the designer to open an existing model or create a blank model. The Model Explorer state displays a hierarchical tree that represents the model. The tree can be used to modify the model hierarchy and to navigate the model. The Logic Elements state is used to define the building blocks of the model. Icons representing model elements are displayed in the Logic Elements task panel. The Layout Styles state is used to customize the layout of the iView. The Field Definitions state is used when defining the flow of information in an iView. The Element Properties state is used to define properties of the various model elements. The Data Sources state is used to import business functions into the model. The Code Compiler state is used to compile and deploy the portal business packages. The Model Debugger state is used to validate the logic of your model.

Figure 9:
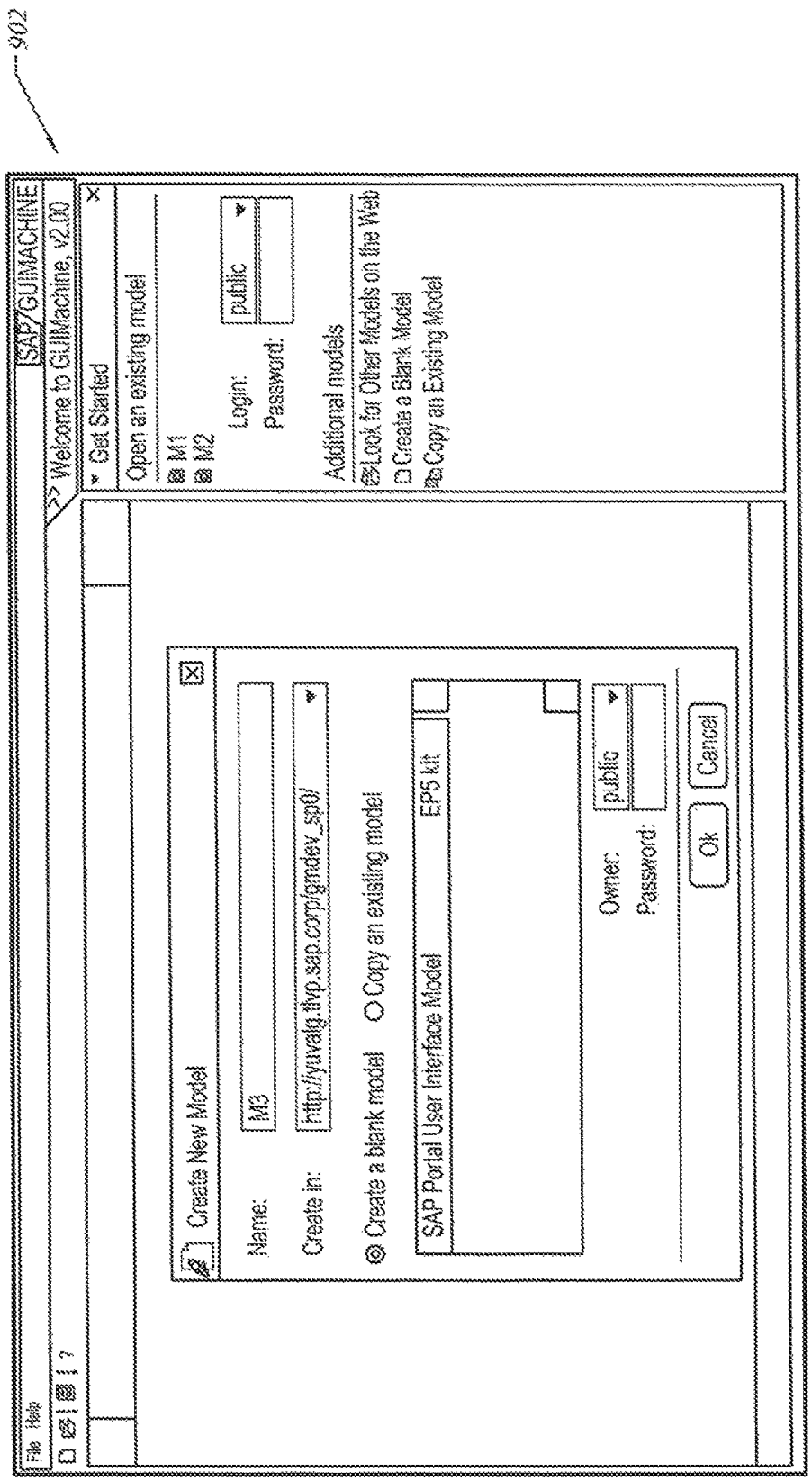
FIG. 9 illustrates a screen for opening a new model to start creating a user interface according to one embodiment of the present invention.

Referring back to the process 700, a new or existing GM model is opened to create or modify a visual representation of UI (step 704). A screen 902 illustrates the step 704 (FIG. 9). The name of the GM model is inputted. The GM model comprises one or more pages and one or more iViews. The iViews are portal presentation components that performs a specific task, e.g., retrieving specific data from the applications and/or databases and displaying them to the client in a specified way. The iView may be used to refer to both the components that performs the required task as well as the information displayed to the user. Hence the term iView is derived from the words "integrated view." The page is a container that includes one or more iViews. The iView corresponds to the actor 450 and is comprised of atomic actors, e.g., business functions. The page is a special type of scenario 430.

Once the GM model has been opened, high level elements are added to the GM model using the task panel 806 (step 706). The GM model defines a hierarchy of elements. The hierarchy may contain any of the following high level elements: pages, iViews, and modules. The pages and iViews in the GM model are eventually compiled into portal pages and portal presentation components. Modules are used to organize pages and iViews in the model, in much the same way that folders are used to organize files in a file management system. Modules correspond to the package 410 in one implementation.

The properties for the high level model elements added to the GM model are defined (step 708). The name and behavior of the page are defined. The behavior of the page includes whether or not a portal user can remove iViews from the page at runtime or rearrange iViews on the page at runtime. The name and behavior of iView are defined. The iView behavior defines how it is loaded and embedded in the a portal page on the client's machine.

Figure 7D:
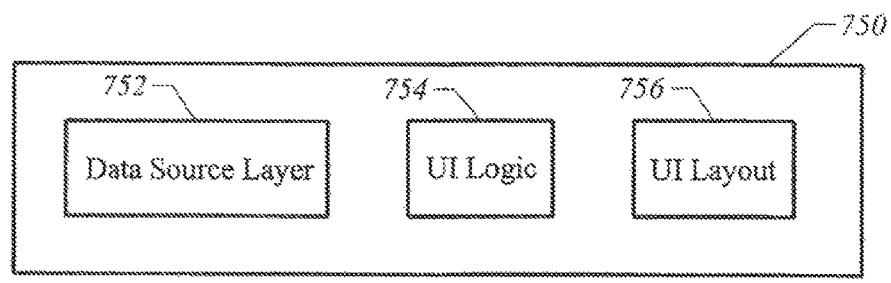
FIG. 7D illustrates a portal presentation component including a data source layer, UI logic, and UI layout according to one embodiment of the present invention.

Thereafter, the iView that has been defined at step 708 is built by creating the data source layer, constructing the UI logic, and customizing the layout (step 710). The data source layer adds the definition of a data source into the model, defining the underlying metadata of the application. For example, the Remote Function Calls (RFCs) and Business Application Program Interfaces (BAPIs) used by an iView to display a list of customers. These RFCs and BAPIs are atomic actors. As used herein, the components of the data source layer are referred to as data source objects. The UI logic defines the UI components (e.g., form view, list view, grid view) and the connections between them. The UI logic also defines the connection between the UI components to the data source objects and data operators such as filters, sort functions, and aggregation functions. The layout defines all the visual aspects of the iView. FIG. 7D illustrates an exemplary iView 750 including a data source layer 752, a UI logic 754, and a UI layout 756.

Figure 7E:
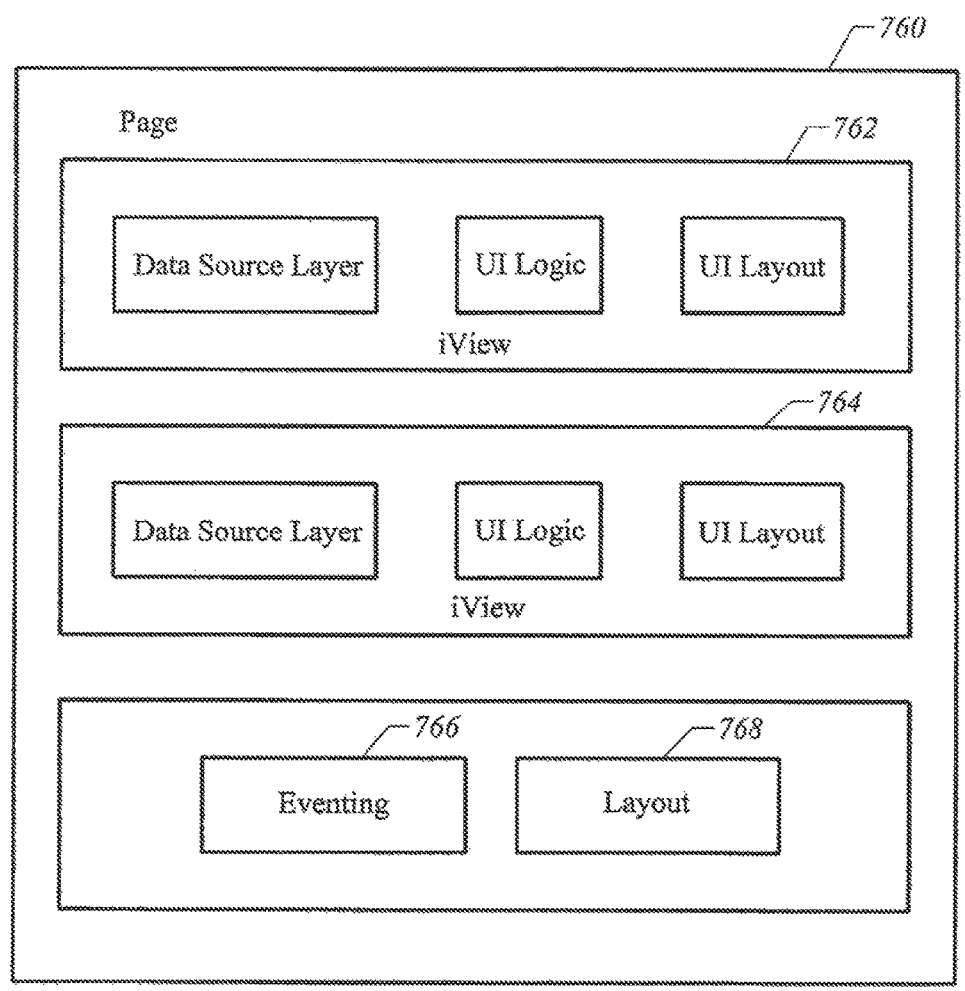
FIG. 7E illustrates a portal page including a plurality of presentation components according to one embodiment of the present invention.
Figure 8:
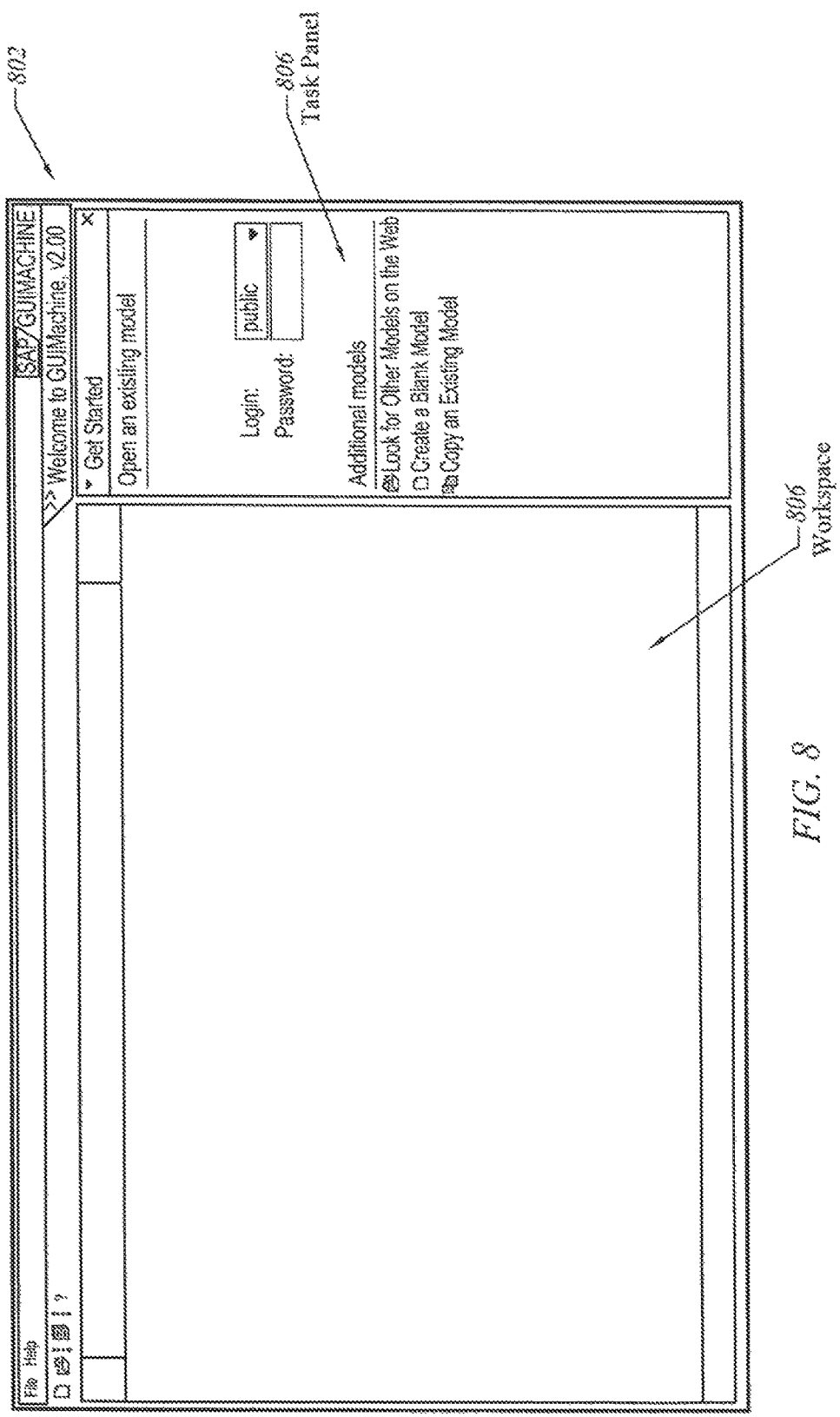
FIG. 8 illustrates a screen that appears when the GUIMachine is launched according to one embodiment of the present invention.

At a step 712, if the designer wishes to build another iView steps 706-710 are repeated. FIG. 7E illustrates a page 760 including a first iView 762, a second iView 764, an eventing 766, and layout 768. The eventing 766 refers to the Enterprise Portal Communication Messaging (EPCM) mechanism for sending messages between two iViews on the same page. In the GUIMachine model, the eventing corresponds to asynchronous message bindings 441 between two iView scenes 440 in a page/scenario 430. Each iView includes data source layer, UI logic, and UI layout.

Once the GM model has been completed, the model is compiled to executable code and deployed to the portal, so that it can be used to access the portal content (step 714). As the GM model is being built, the GML code/model or canonic representation is automatically generated. Any changes made to the visual representation is also dynamically reflected on the GML model. Accordingly, the diagram or visual representation being created is a "live diagram."

Figure 14:
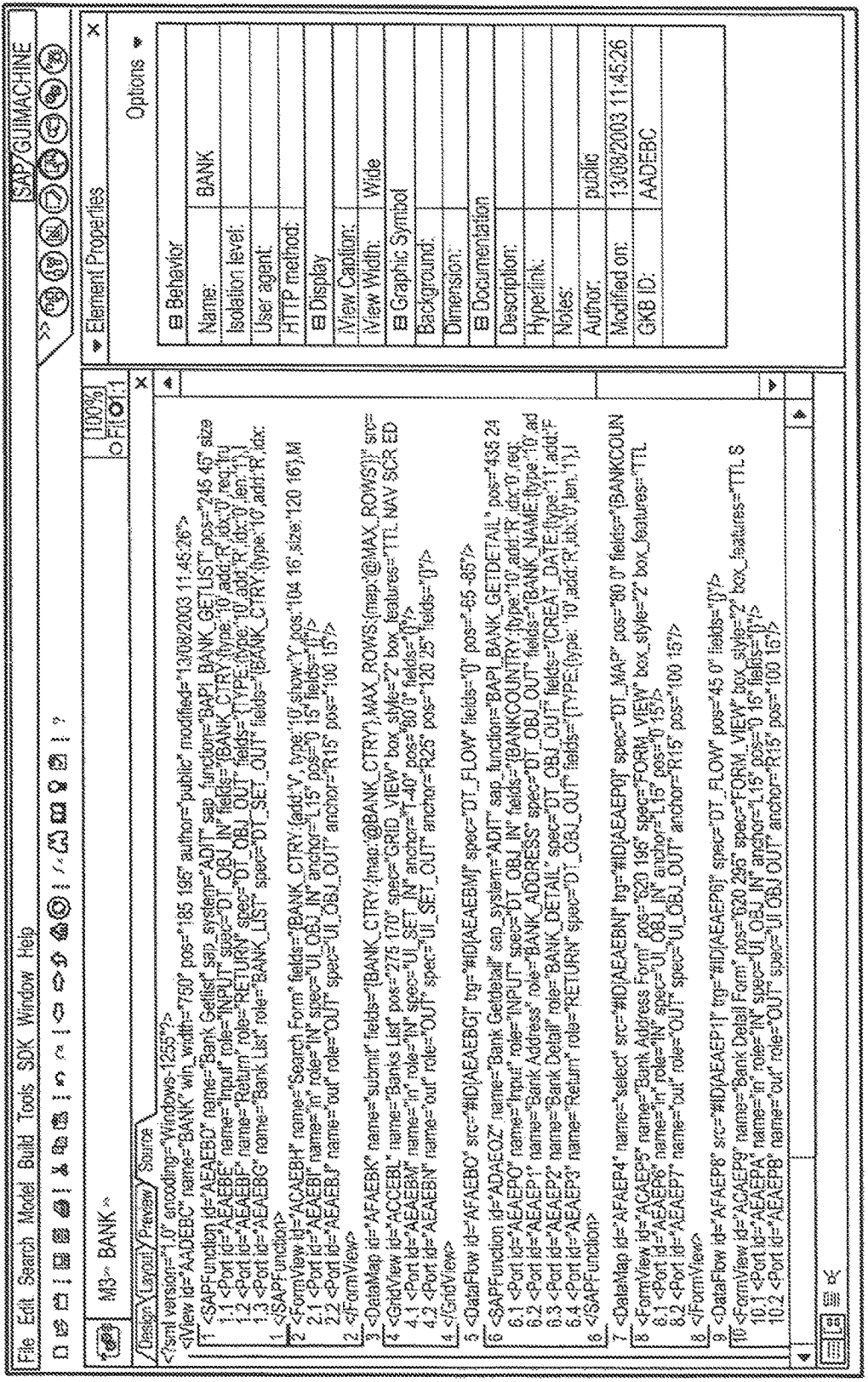
FIG. 14 illustrates a screen for displaying a canonic representation of the iView that has been built according to one embodiment of the present invention.
Figure 15:
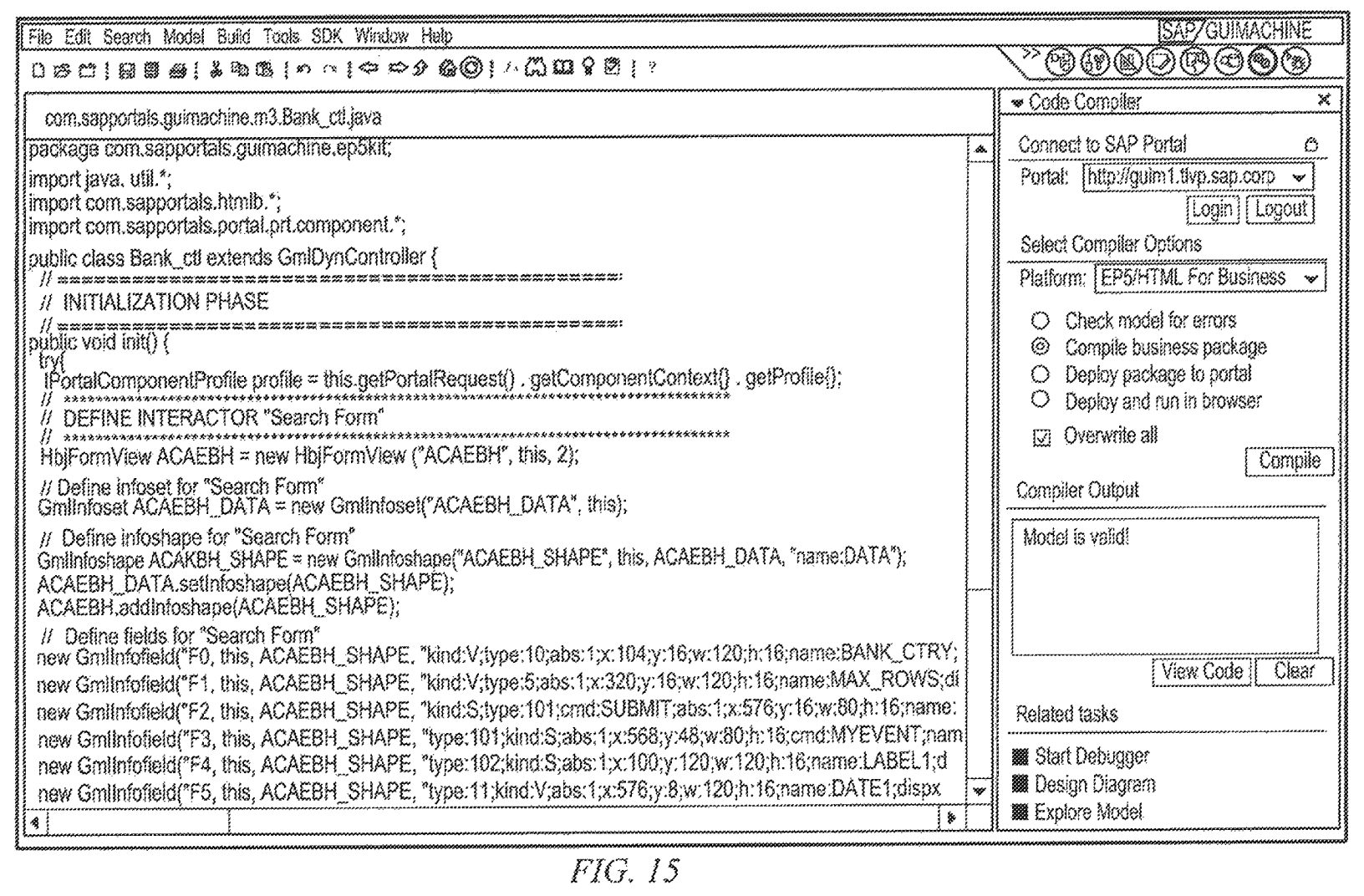

FIG. 14 illustrates an exemplary canonic representation, as can be seen by selecting the source tab. The GML code is compiled to a language that is supported by the portal, as shown by FIG. 15. The GM compiler also checks the model for error and deploys the compiled content directly to the portal. By using an appropriate compiler, executable code can be generated from the GML model to any target platform. The same model may be compiled to different platforms/languages at the same time in one implementation of the present embodiment.

FIG. 7C illustrates step 710 for building an iView in more detail according to one embodiment of the present invention. The iView building step 710 includes a plurality of sub-steps 722-728. At sub-step 722, data sources are added to the iView. The GUIMachine (GM) enables the client to connect to the applications defined in the portal system landscape via a portal connectivity framework. From this connection, desired RFCs or BAPIs may be imported into the iView. The imported RFCs and BAPIs are referred to as data source objects. The data source objects correspond to actors 450.

Figure 10A:
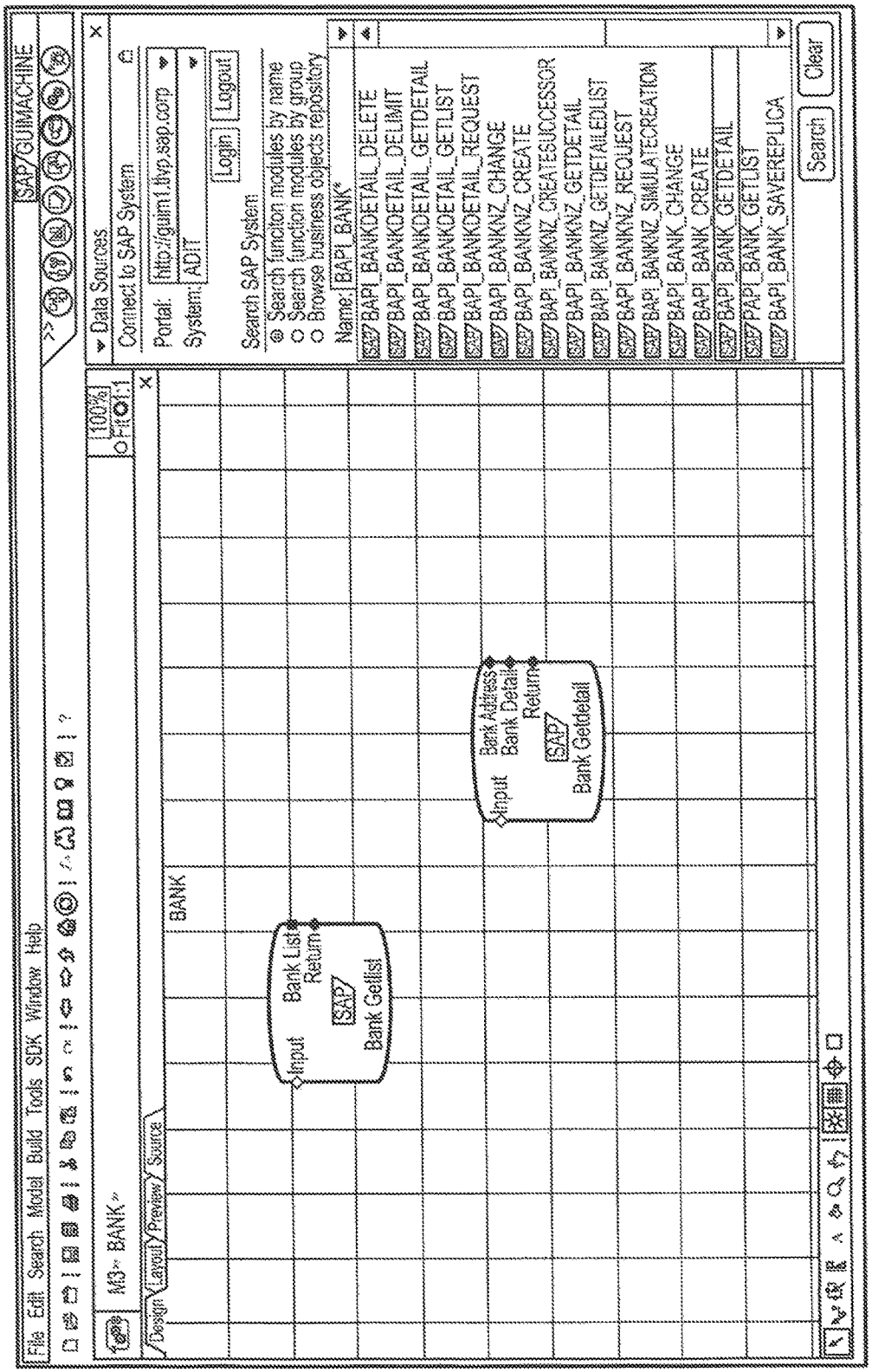
FIG. 10A illustrates data source objects being inserted into the workspace of the GUIMachine according to one embodiment of the present invention.
Figure 10B:
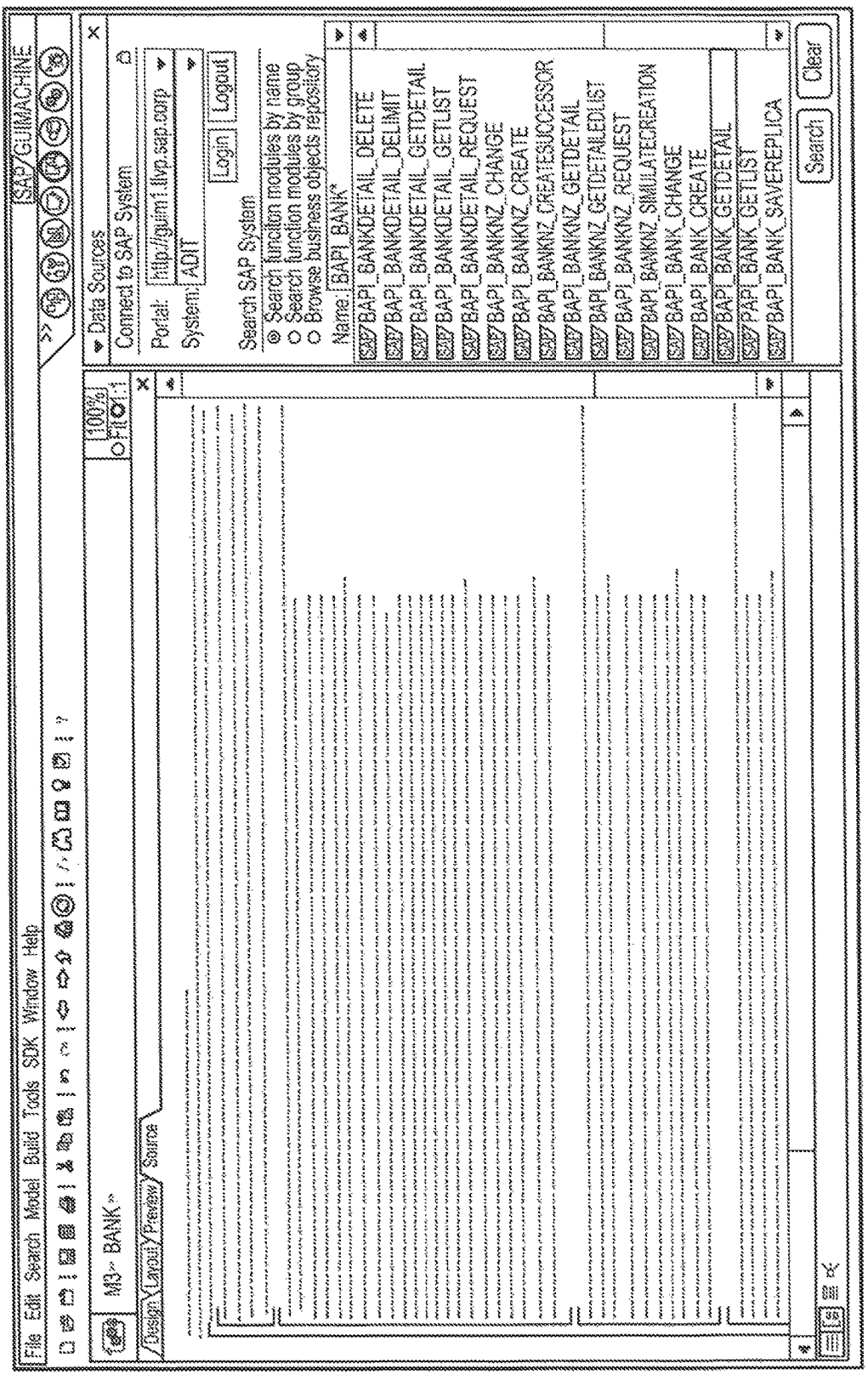
FIG. 10B illustrates a canonic representation of FIG. 10A.

The desired RFCs and BAPIs are selected by using a search module or browsing business objects repository. The selected RFCs and BAPIs are imported to the iView by dragging and dropping them on the workspace 804. FIG. 10A illustrates importing of function modules BAPI_GETLIST and BAPI_GETDETAIL from the Data Sources task bar into the workspace. Once these data source objects are inserted into the workspace, their unique names are added to the canonic representation of the iView. The unique names of the data source objects correspond to their addresses. These names are used to call these business functions subsequently from the portal server. FIG. 10B illustrates the GML code that is automatically generated in response to the sub-step 722. The full text of the GML code is provided as an Appendix A.

Next the UI logic is defined (step 724) Generally, the UI logic defines what UI components are presented to the user at run time (e.g., whether the iView displays data in a grid view or a list view, or displays an input form that lets the user enter search parameters for a specific data set) and how a user may interact with the components (e.g., whether the data display is static, or whether the user can manipulate the data displayed on the screen, by launching a search for a specific sub set of data, or by drilling down on a displayed record for more detailed information). The UI logic also defines the underlying data queries that control how information is retrieved from the portal applications and whether or not the data is to be manipulated prior to being displayed on the client machine, e.g., with a filter or sort operator.

To define the UI logic, UI component objects and operators are added to the model. The flow of information between all the iView elements, including the UI components, the underlying data source objects (e.g., SAP functions), and the operators are specified.

Figure 11A:
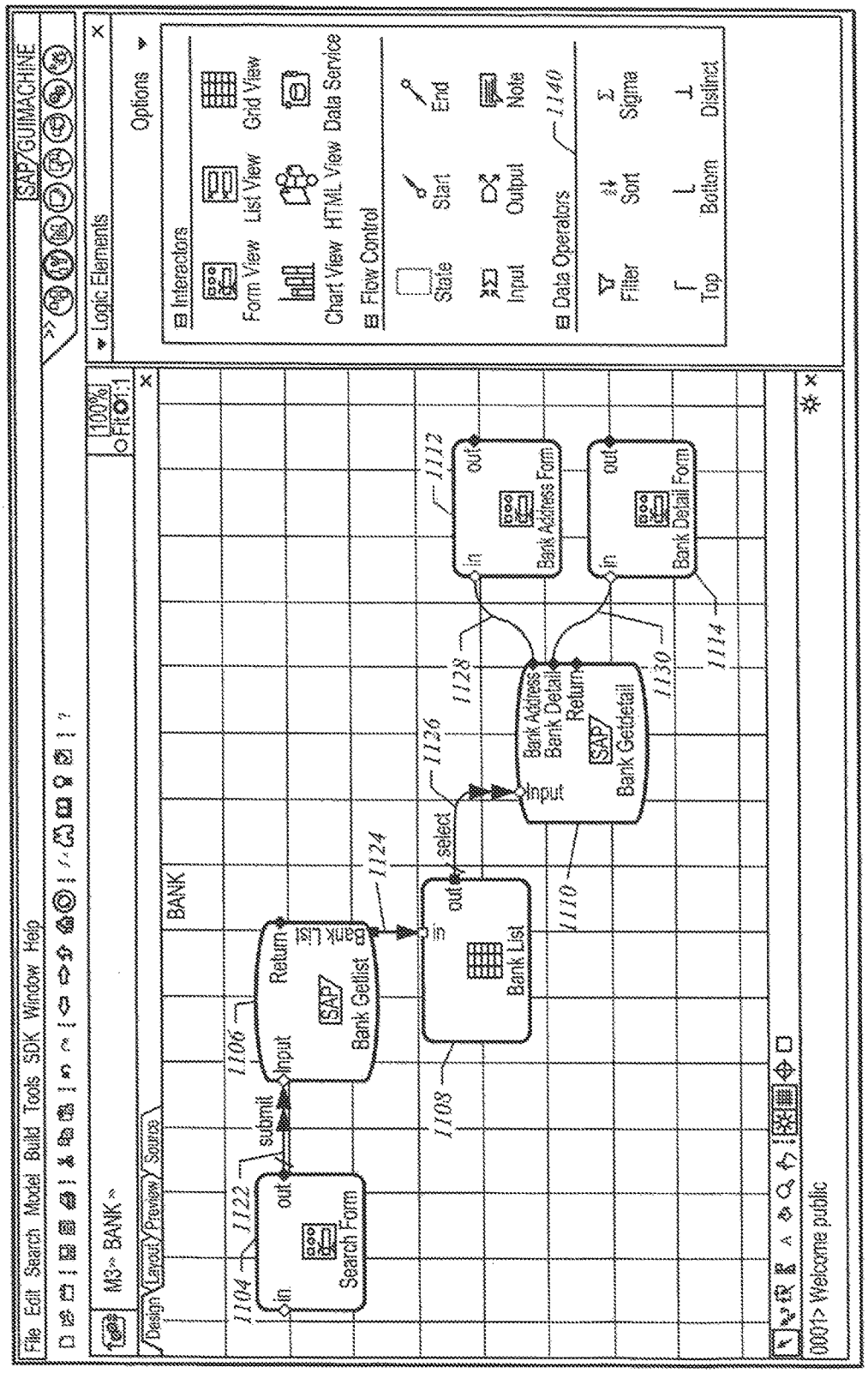
FIG. 11A illustrates defining of UI logic to the iView according to one embodiment of the present invention.

FIG. 11A illustrates a screen 1102 whereon UI components are added to the iView. The screen 1102 includes a search form 1104, a BAPI_GETLIST 1106, a bank list 1108, BAPI_GETDETAIL 1110, a bank address form 1112, and a bank detail form 1114. The search form 1104, an interactor, is added to invoke the BAPI_GETLIST function. The results of the query will be displayed in the bank list grid interactor 1108. When a user selects any row in the bank list grid 1108, the BAPI_GETDETAIL 1110 will be invoked with corresponding bank key. The result of BAPI_GETDETAIL 1110 will be displayed in the bank address and bank detail forms 1112 and 1114. Each of the above are actors that are configured to perform or invoke particular tasks. As they are inserted in to the workspace, their unique names are being added to the canonic representation in the form of GML code, so that they may be referenced from the portal server-side code subsequently at the runtime.

Figure 11B:
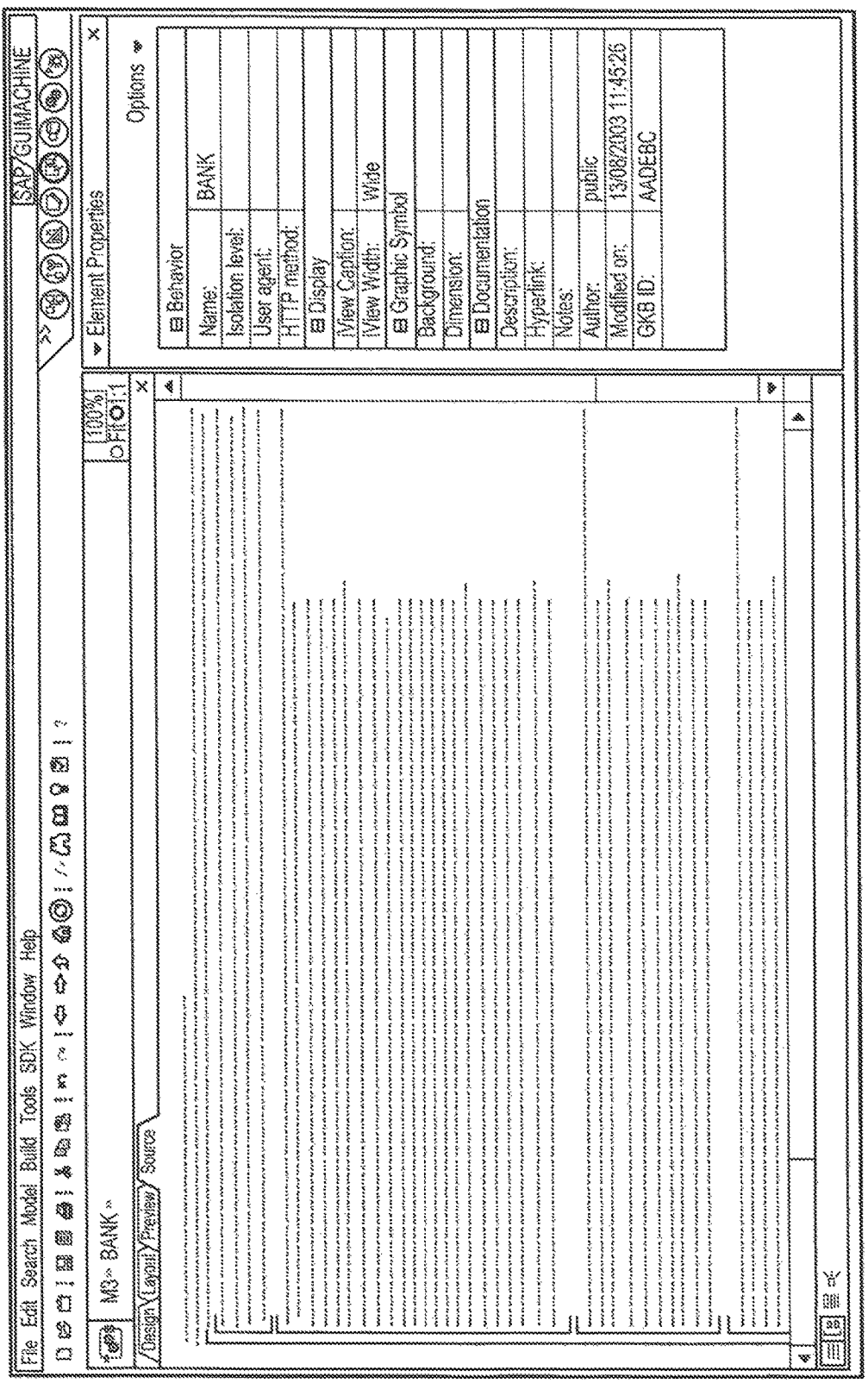
FIG. 11B illustrates a canonic representation of FIG. 11A.

The relationship between them are defined by the connections 1122-1130. The connection 1122 connects an output port of the search form 1104 to an input port of the BAPI_GETLIST 1106. The connection 1124 connects an output port of the BAPI_GETLIST to an input port of the bank list 1108. The connection 1126 connects an output port of the bank list 1108 to an input port of the BAPI_GETDETAIL 1110. The connection 1128 connects a first output port of the BAPI_GETDETAIL to an input port of the bank address form 1112. The connection 1130 connects a second output port of the BAPI_GETDETAIL to an input port of the bank detail form 1114. FIG. 11B shows a canonic representation of the screen 1102. The GML code associated with FIG. 11B is provided in Appendix B.

The connections may be for data mapping, data flow, or data binding. The data mapping defines the flow of information from a UI component or data source object to a data source object, e.g., the connection 1122. The information, in this case, is the input required by a business function underlying the data source object. The data mapping is performed if an output of one element in the iView is used as an input of another element in the iView.

The data flow defines the flow of information from a data source object to a UI component, e.g., the connection 1124 and 1128. The data returned by the business function underlying the data source object is displayed in the UI component. Data flow occurs when data source object output is channeled to a UI component for display. For example, data flow from a single data source object to multiple UI components may be defined. Each output port can connect to one or more UI components. The UI components include Form View, List View, Grid View, and HTML View.

The data binding defines the flow of information from a UI component to another UI component. Data binding occurs when the output port of one UI component is connected to the input port of another UI component. In this situation, the underlying data set is the same. Therefore changes to the data displayed in one UI component affects the other. For example, if your IView includes a function that outputs a list of employees, and details about them, you may display the list of employee names in a grid view, that enables the selection of a record, and then connect the grid view to a form view that displays details about the employee selected (by the portal user) from the grid.

One or more operators may be inserted into the UI logic to manipulate returned data before displaying it in a UI component. For example, the data may be filtered or sorted prior to being displayed. The operators are connected to the input and output ports of data source objects. The operators include Filter, Sort, Sigma, Top, Bottom, and Distinct. These data operators are illustrated on a data operator section 1140.

Figure 12:
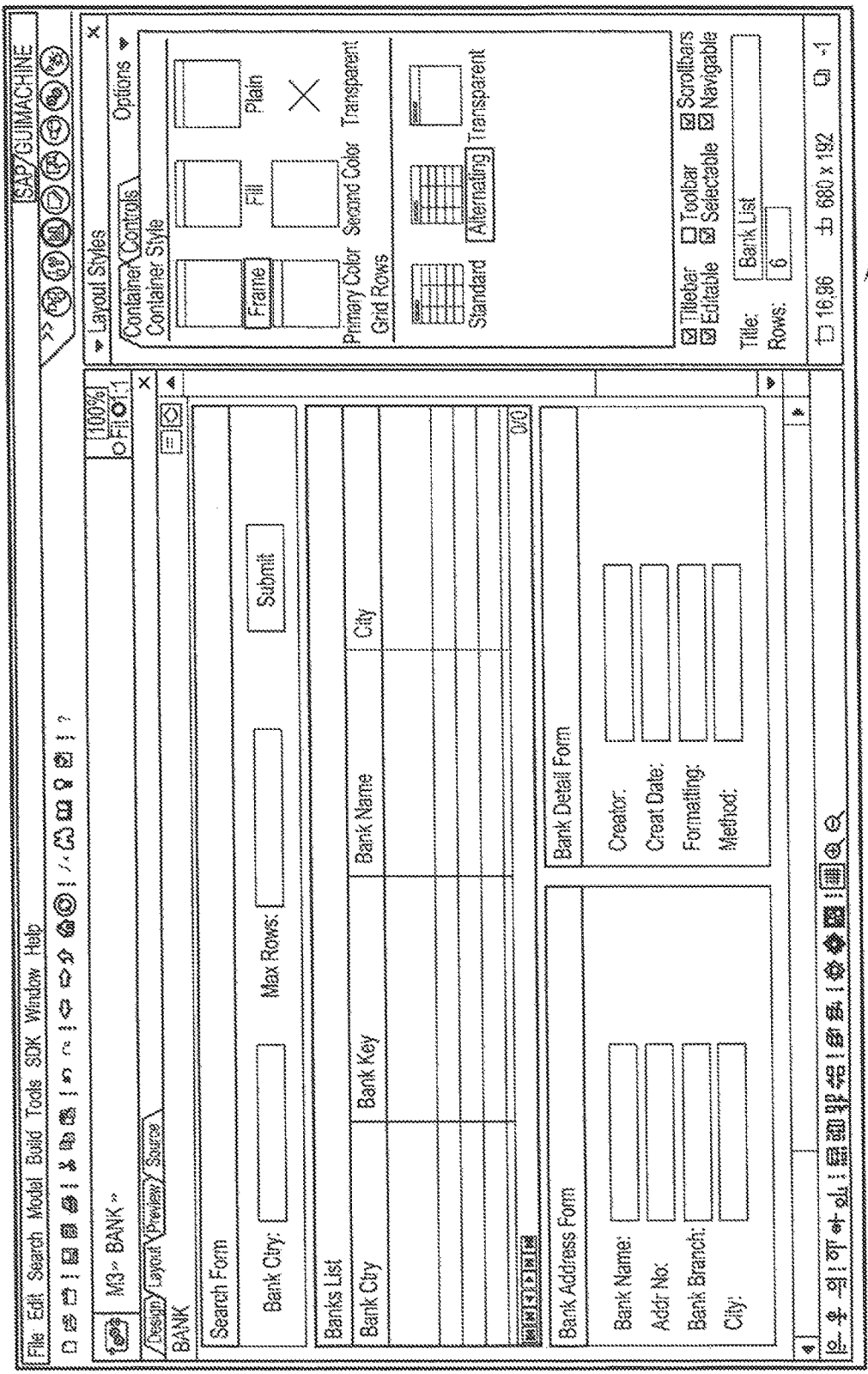
FIG. 12 illustrates a screen used to customize the iView layout according to one embodiment of the present invention.

At a sub-step 726, the iView layout is customized according to the user preference or needs. A default iView layout is provided when the iView logic is built. This default layout can be modified, so the display of the information may be tailored to specific needs. The iView is completed after sub-step 726. FIG. 12 illustrates a screen 1202 for customizing the iView layout.

Figure 13:
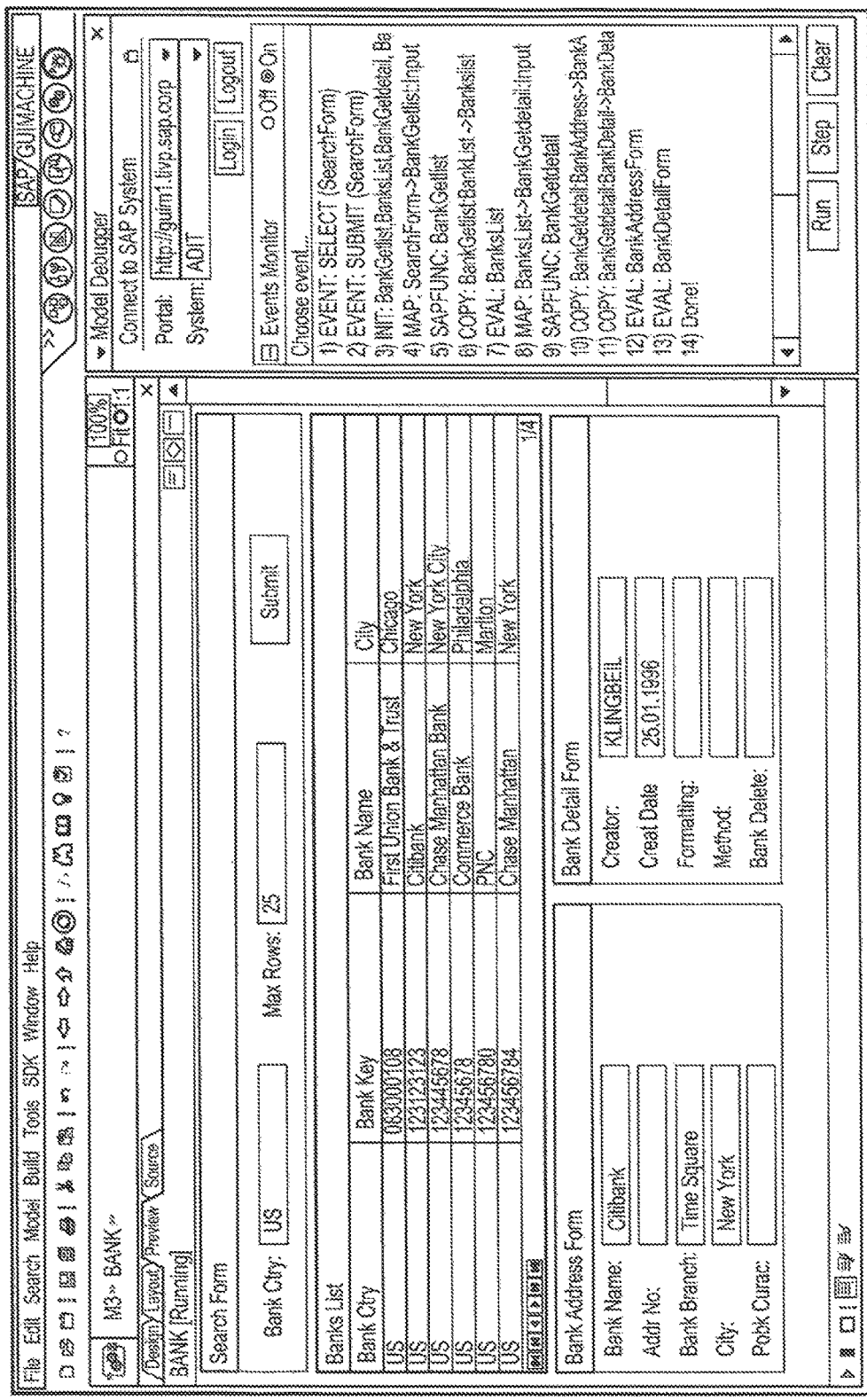
FIG. 13 illustrates a screen used to preview the results obtained by the iView according to one embodiment of the present invention.
Figure 16:
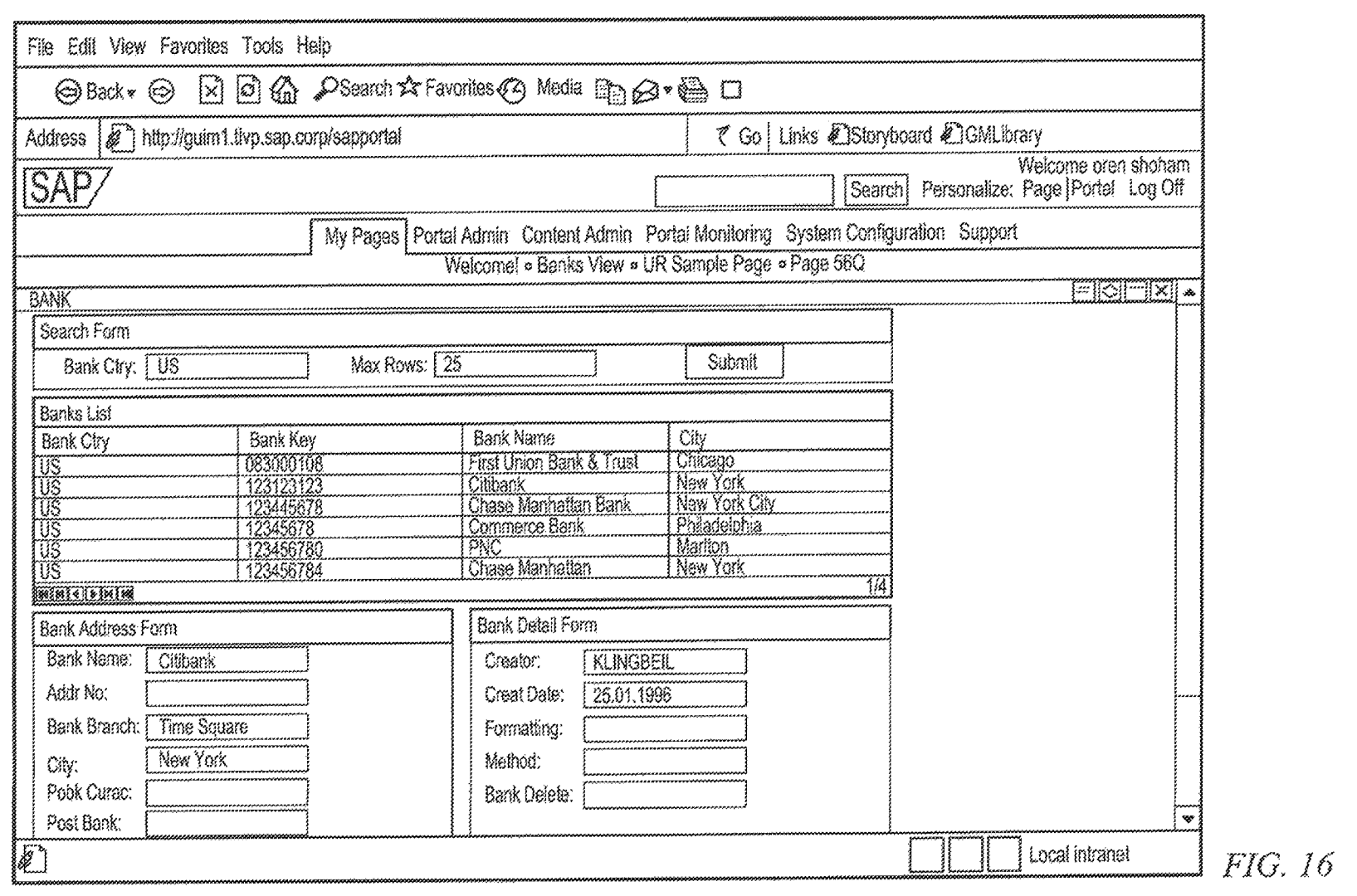

Thereafter, the iView that has been built may be tested (step 728). The test is performed by selecting the preview tab on the workspace. FIG. 13 illustrates a screen 1302 for previewing the results of the iView that has been built. FIG. 14 illustrates a GML model or canonic representation of the iView that has been built. FIG. 15 illustrates executable code that has been compiled from the GML model of FIG. 14. FIG. 16 illustrates a portal content displayed on the client side using the executable code from the FIG. 15.

Figure 17:
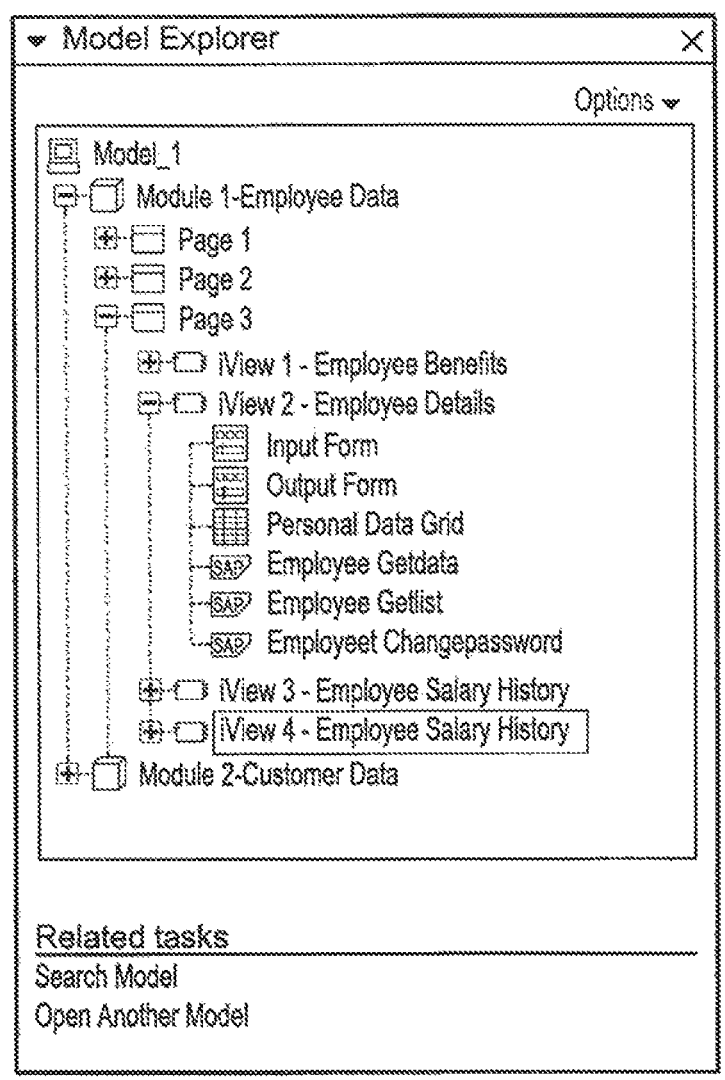
FIG. 17 illustrates the hierarchical organization of a model that has been created using the GUIMachine according to one embodiment of the present invention.

FIG. 17 illustrates the hierarchical organization of a GM model that has been created using the GM Storyboard according to one embodiment of the present invention. Model 1 includes a first module for employee Data, and a second module for customer Data. Each module includes one or more pages. Each page includes one or more iViews. Each iView includes one or more business functions and UI logics. For example, View 2 for Employee Details includes Input Form, Output Form, Personal Data Grid, Employee Getdata, Employee Getlist, Employee Changepassword.

The above description has been presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

What is claimed is:

1. A method comprising:
providing an editor for designing a visual representation of a user interface, the editor providing a workspace and a task panel to be displayed on a display device;
displaying a scenario on the workspace, the scenario being compatible with user requirements for the user interface, the scenario including a plurality of scenes, wherein each scene in the plurality of scenes includes concurrently active and collaborating actors, the actors being specialized computational units that represent threads of activities;
defining each scene in the plurality of scenes by diagrammatically defining a relationship between actors associated with that scene;

generating a canonic representation of a model represented by the scenario and the scenes; and
generating executable user interface code from the canonic representation.

2. The method of claim 1, wherein the plurality of scenes represent a plurality of coupled activities.

3. The method of claim 2, wherein each scene in the plurality of scenes represents a particular task.

4. The method of claim 2, wherein each scene in the plurality of scenes represents a particular dialogue state.

5. The method of claim 1, wherein each scene in the plurality of scenes is based on one of a plurality of scene prototypes, wherein each scene prototype in the plurality of scene prototypes comprises a fixed set of sub scenes.

6. The method of claim 5, wherein each scene prototype in the plurality of scene prototypes is associated with a particular class of user interface or industry.

7. A non-transitory computer readable medium comprising instructions, that when executed on a computer processor, causes the computer processor to:
provide an editor for designing a visual representation of a user interface, the editor providing a workspace and a task panel to be displayed on a display device;
display a scenario on the workspace, the scenario being compatible with user requirements for the user interface, the scenario including a plurality of scenes, wherein each scene in the plurality of scenes includes concurrently active and collaborating actors, the actors being specialized computational units that represent threads of activities;
define each scene in the plurality of scenes by diagrammatically defining a relationship between actors associated with that scene;
generate a canonic representation of a model represented by the scenario and the scenes; and
generate executable user interface code from the canonic representation.

8. The non-transitory computer readable medium of claim 7, wherein the plurality of scenes represent a plurality of coupled activities.

9. The non-transitory computer readable medium of claim 8, wherein each scene in the plurality of scenes represents a particular task.

10. The non-transitory computer readable medium of claim 8, wherein each scene in the plurality of scenes represents a particular dialogue state.

11. The non-transitory computer readable medium of claim 7, wherein each scene in the plurality of scenes is based on one of a plurality of scene prototypes, wherein each scene prototype in the plurality of scene prototypes comprises a fixed set of sub scenes.

12. The non-transitory computer readable medium of claim 11, wherein each scene prototype in the plurality of scene prototypes is associated with a particular class of user interface or an industry.

13. A system comprising:
one or more computer processors; and
a non-transitory computer readable medium comprising instructions, that when executed by the one or more computer processors, cause the computer processors to:
provide an editor for designing a visual representation of a user interface, the editor providing a workspace and a task panel to be displayed on a display device;
display a scenario on the workspace, the scenario being compatible with user requirements for the user interface, the scenario including a plurality of scenes, wherein each scene in the plurality of scenes includes concurrently active and collaborating actors, the actors being specialized computational units that represent threads of activities;
define each scene in the plurality of scenes by diagrammatically defining a relationship between actors associated with that scene;
generate a canonic representation of a model represented by the scenario and the scenes; and
generate executable user interface code from the canonic representation.

14. The system of claim 13, wherein the plurality of scenes represent a plurality of coupled activities.

15. The system of claim 14, wherein each scene in the plurality of scenes represents a particular task.

16. The system of claim 14, wherein each scene in the plurality of scenes represents a particular dialogue state.

17. The system of claim 13, wherein each scene in the plurality of scenes is based on one of a plurality of scene prototypes, wherein each scene prototype in the plurality of scene prototypes comprises a fixed set of sub scenes.

18. The system of claim 17, wherein each scene prototype in the plurality of scene prototypes is associated with a particular class of user interface or an industry.

* * * * *